(12) United States Patent
Placitelli et al.

(10) Patent No.: US 11,551,050 B2
(45) Date of Patent: Jan. 10, 2023

(54) CARD INLAY FOR DIRECT CONNECTION OR INDUCTIVE COUPLING TECHNOLOGY

(71) Applicant: AdvanIDe Holdings Pte. Ltd., Singapore (SG)

(72) Inventors: Alejandro Placitelli, Singapore (SG); Joe Lo, Singapore (SG); Holger Roessner, Singapore (SG)

(73) Assignee: AdvanIDe Holdings Pte. Ltd., Singapore (SG)

( * ) Notice: Subject to any disclaimer, the term of this patent is extended or adjusted under 35 U.S.C. 154(b) by 0 days.

(21) Appl. No.: 17/390,047

(22) Filed: Jul. 30, 2021

(65) Prior Publication Data

US 2022/0147785 A1 May 12, 2022

(30) Foreign Application Priority Data

Nov. 12, 2020 (SG) .............................. 10202011277T

(51) Int. Cl.
*G06K 19/077* (2006.01)
*H01Q 1/22* (2006.01)

(52) U.S. Cl.
CPC ... *G06K 19/0772* (2013.01); *G06K 19/07773* (2013.01); *H01Q 1/2208* (2013.01)

(58) Field of Classification Search
CPC ........ G06K 19/00; G06K 19/04; G06K 19/06; G06K 19/067; G06K 19/07
USPC .................................. 235/492, 380, 487, 375
See application file for complete search history.

(56) References Cited

U.S. PATENT DOCUMENTS

| | | |
|---|---|---|
| 6,190,942 B1 | 2/2001 | Wilm et al. |
| 6,378,774 B1 | 4/2002 | Emori et al. |
| 6,794,727 B2 * | 9/2004 | Leduc .............. G06K 19/07718 257/531 |
| 8,130,166 B2 | 3/2012 | Ayala et al. |
| 8,366,009 B2 | 2/2013 | Finn et al. |

(Continued)

FOREIGN PATENT DOCUMENTS

| | | |
|---|---|---|
| CN | 102222262 B | 8/2016 |
| DE | 4311493 A1 | 10/1994 |

(Continued)

OTHER PUBLICATIONS

Extended European search report dated Mar. 11, 2022 with corresponding EP Application No. 21206105.5; 9 pages.

(Continued)

*Primary Examiner* — Edwyn Labaze
(74) *Attorney, Agent, or Firm* — Maier & Maier, PLLC

(57) ABSTRACT

An inlay for a chip card. The inlay includes a module coupling antenna for inductively coupling to a chip module antenna of a chip module and a card reader coupling antenna for inductively coupling to a reader antenna of an external card reader. The card reader coupling antenna is electrically connected to the module coupling antenna. The inlay also includes a chip capacitor module that is electrically connected to the card reader coupling antenna for enabling the card reader coupling antenna to resonate at a predetermined frequency. The chip capacitor module includes at least one passive component for storing electrical energy. The at least one passive component has a capacitance within a range from 40 picofarads to 140 picofarads and a major area that is smaller than 2.6 square millimetres.

27 Claims, 26 Drawing Sheets

(56) References Cited

U.S. PATENT DOCUMENTS

| | | |
|---|---|---|
| 8,474,726 B2 | 7/2013 | Finn |
| 8,708,240 B2 | 4/2014 | Finn |
| 8,833,668 B2 | 9/2014 | Grieshofer et al. |
| 8,899,490 B1 | 12/2014 | Chen |
| 8,991,712 B2 | 3/2015 | Finn et al. |
| 9,033,250 B2 | 5/2015 | Finn et al. |
| 9,070,053 B2 | 6/2015 | Mosteller |
| 9,070,979 B2 | 6/2015 | Hofer et al. |
| 9,076,093 B2 | 7/2015 | Seo et al. |
| 9,165,240 B2 | 10/2015 | Finn et al. |
| 9,195,932 B2 | 11/2015 | Finn et al. |
| 9,239,982 B2 | 1/2016 | Finn |
| 9,275,324 B2 | 3/2016 | Grieshofer et al. |
| 9,390,366 B1 | 7/2016 | Herslow et al. |
| 9,449,269 B2 | 9/2016 | Finn et al. |
| 9,547,814 B2 | 1/2017 | Mosteller |
| 9,633,304 B2 | 4/2017 | Finn et al. |
| 9,721,200 B2 | 8/2017 | Herslow et al. |
| 10,032,099 B2 | 7/2018 | Mosteller |
| 10,089,570 B2 | 10/2018 | Herslow et al. |
| 10,235,543 B2 | 3/2019 | Pachler et al. |
| 10,445,628 B2 | 10/2019 | Mosteller |
| 10,699,179 B1 | 6/2020 | Yoon et al. |
| 11,048,991 B2 | 6/2021 | Mosteller et al. |
| 2005/0125093 A1* | 6/2005 | Kikuchi ............ G06K 19/0726 235/375 |
| 2005/0274794 A1 | 12/2005 | Bason et al. |
| 2015/0162327 A1* | 6/2015 | Niiyama ................ H01G 4/012 257/529 |
| 2015/0206047 A1 | 7/2015 | Herslow et al. |
| 2015/0269477 A1 | 9/2015 | Finn et al. |
| 2016/0104065 A1* | 4/2016 | Tsukada ........... G06K 19/07794 235/492 |
| 2016/0141248 A1* | 5/2016 | Pueschner ........ G06K 19/07747 257/679 |
| 2017/0308785 A1* | 10/2017 | Kim ................. G06K 19/07722 |
| 2018/0018551 A1 | 1/2018 | Carrier et al. |
| 2018/0157954 A1 | 6/2018 | Herslow et al. |
| 2018/0341847 A1* | 11/2018 | Finn ................. G06K 19/07783 |
| 2019/0197384 A1 | 6/2019 | Pachler |
| 2020/0065641 A1 | 2/2020 | Pachler et al. |
| 2020/0151535 A1 | 5/2020 | Herslow et al. |
| 2020/0167628 A1 | 5/2020 | Pachler et al. |

FOREIGN PATENT DOCUMENTS

| | | |
|---|---|---|
| DE | 102019105667 A1 | 9/2020 |
| EP | 0956537 A1 | 11/1999 |
| JP | 2001043340 A | 2/2001 |
| RU | 2675289 C2 | 12/2018 |
| WO | 2015128188 A2 | 9/2015 |
| WO | 2019/136436 A1 | 7/2019 |
| WO | 2019164055 A1 | 8/2019 |
| WO | 2019/173455 A1 | 9/2019 |
| WO | 2020/115375 A2 | 6/2020 |

OTHER PUBLICATIONS

Office Action dated Oct. 11, 2022, in corresponding Russian Application No. 2021132441, 24 pages.

* cited by examiner

INLAYS
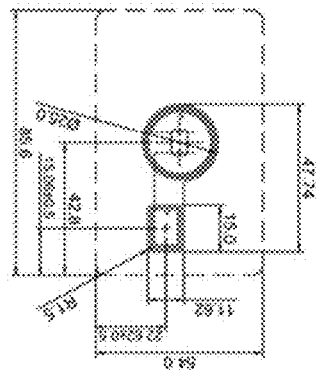
inlay 13d of Fig. 11
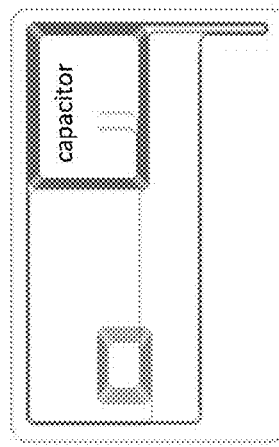
inlay B
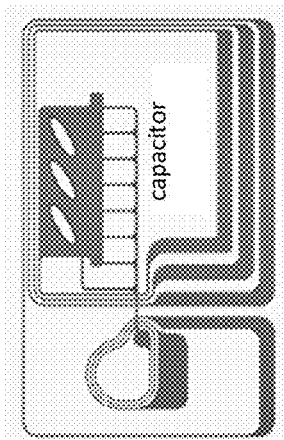
inlay A
FIG. 13

CARD INLAY FOR DIRECT CONNECTION OR INDUCTIVE COUPLING TECHNOLOGY

FIELD

This application relates to a smart card.

BACKGROUND

A smart card, which carries information, can be distinguished as a contact type, a contactless type, or a combined type, according to the manner employed in reading data from the smart cards. The contact type of smart card has a contact interface to enable a card identification device or card reader to read data from the smart card that contacts with the card reader. The contactless type of smart card has a contactless or wireless interface to enable an external card reader to read data from the smart card using radio frequency (RF) waves. The combined type of smart card or a dual-interface smart card has a contact interface and a wireless interface for enabling a card reader to read data from the smart card via contacting or via RF waves. The contactless technologies enhance the ease and speed of use of the cards for identification, authentication, data storage, application processing, and payment transactions.

Smart cards can be made of plastic or metal. Metal cards are more durable than plastic cards as they cannot be bent, scratched, and snapped easily. Furthermore, the metal cards are shiny in appearance and heavier, providing a feel of more exclusive and a prestigious image to users when the cards are used.

WO2019173455 discloses a card core. The card core includes a body defining a cut-out and a discontinuity. The cut-out includes an opening in the body which is defined by an edge. The discontinuity includes a channel that is defined by the body which extends from an outer surface of the body to the cut-out. At least one circuit element is positioned within the cut-out. The cut-out further defines a size and geometry such that a gap is defined between the at least one circuit element and the edge to electromagnetically isolate the at least one circuit element from the body.

US2020167628 discloses a chip card. The chip card includes a metal layer comprising an opening and a slot that extends from one edge of the opening to an outer edge of the metal layer. The chip card further includes a booster antenna structure that is arranged in the opening. The booster antenna structure has an antenna section for electromagnetically coupling to the metal layer and has a coupling section for electromagnetically coupling to an antenna structure of a chip module.

SUMMARY

It is an object of this application to provide an improved inlay for a smart card.

It is believed that a metal card can be improved by including an improved inlay comprising a wireless interface.

A plastic card can be improved by comprising an improved inlay that comprises a wireless interface.

The application provides an improved chip card. The chip card includes a first dual-interface chip card that uses inductive coupling technology.

The first dual-interface chip card comprises a layer of metal that forms a body of the chip card. The metal layer includes an opening that extends to an outer edge of the metal layer. The opening can include a slot portion, which is an elongated hole that extends from the other part of the opening to the outer edge of the metal layer. The slot portion or the opening portion near the outer edge of the metal layer is intended for breaking a conductive loop that goes through the opening in the metal layer, thereby preventing an eddy current from forming a closed loop surrounding the opening. The first dual-interface chip card is also called the first dual-interface smart card.

The chip card includes a chip module, which refers to an integrated circuit (IC) or a microelectronic chip, which includes functions of a microprocessor. The chip module also includes a chip module antenna, which is electrically connected to the chip module.

The chip card also includes a contact interface. The contact interface is electrically connected to the chip module for electrically connecting the chip module to an external card reader when the chip card is positioned in the external card reader. The contact interface of the chip card then comes in contact with the contact pins of the card reader to provide an electrical path between the chip module of the chip card and a computing processor of the card reader.

The chip card further includes an improved inlay, which is arranged in the opening.

The inlay further includes a module coupling antenna. The module coupling antenna can be a wired antenna that is made of electrical wire. The module coupling antenna is used for inductively coupling to the chip module antenna. A change in an electrical current flowing through the module coupling antenna creates a changing magnetic field around it and the changing magnetic field induces a voltage in the chip module antenna. Conversely, a change in an electrical current through the chip module antenna also induces a voltage in the module coupling antenna. The inductive coupling is also called electromagnetic coupling.

The inlay also includes a card reader coupling antenna. The card reader coupling antenna can also be a wire antenna. It is intended for inductively coupling to a reader antenna of an external card reader that is positioned a distance away from the chip card. The card reader coupling antenna is electrically or integrally connected to the module coupling antenna.

The inlay further includes a chip capacitor module that is electrically connected to two terminals of the card reader coupling antenna. The electrical connection between the terminals and the chip capacitor module can include a galvanic connection that is produced using thermocompression bonding, conductive glue, or soldering.

The chip capacitor module comprises at least one discrete passive component for storing electrical energy. This passive component can be provided as a discrete capacitor. The capacitor often includes at least two electrical conductors that are separated by a dielectric layer. An example of a discrete capacitor is a ceramic capacitor that has a dielectric layer is made of ceramic. The chip capacitor module can include a surface mount (SMT) package that encapsulates the ceramic capacitor. Alternatively, the chip capacitor module can also include a chip on board (COB) package that encapsulates the ceramic capacitor, wherein the ceramic capacitor is attached to a substrate and the substrate with the capacitor is covered by one or more resin layers. The ceramic capacitor is often small. It can have a shape of a rectangular block having a length of about 0.4 millimetres (mm), a width of about 0.2 mm, and a thickness of about 0.2 mm. The ceramic capacitors are commonly used in making small or miniature electronic devices, such as a hearing medical device that can be placed in a tiny space. The ceramic capacitor also often has a fixed, consistent, and accurate capacitance, which can have a capacitance tolerance of 5% or smaller than 5%.

The chip capacitor module acts as a resonant capacitor to enable the card reader coupling antenna to resonate at a predetermined frequency of about 13.56 megahertz (Mhz).

In use, the chip capacitor module enables the card reader coupling antenna to receive RF signals that are transmitted from the card reader in the resonant frequency bandwidth. The card reader coupling antenna then transmits the received signals to the module coupling antenna, which later transmits the received signals to the chip module antenna via inductive coupling. The chip module antenna afterward transmits the received signals to the chip module for processing.

At the resonant frequency, the impedance of the capacitance of the chip capacitor module is essentially equal to the impedance of the combined inductance of the card reader coupling antenna and the module coupling antenna. In other words, the product of the combined inductance of these antennae and the capacitance of the chip capacitor module is essentially a constant. By selecting a chip capacitor module with a larger capacitance, the inductance of the antennae will become smaller. The smaller inductance means the antennae can be smaller in size. This can reduce the size of the opening that receives the antennae and increase the size of the metal portion of the chip card, thereby making the chip card heavier.

The capacitance of the chip capacitor module also cannot be too large because the inductance of the card reader coupling antenna will become too small. If the inductance of the card reader coupling antenna is too small, the size of the card reader coupling antenna will be too small such that RF energy induced onto the antenna will be insufficient to power the electronic parts of the smart card. It is therefore desirable that the capacitance of the chip capacitor module does not exceed a predetermined upper value. The capacitance of the chip capacitor module is also preferred to be larger than a predetermined lower value such that the size of the opening can be reduced sufficiently.

To meet this requirement, the at least one passive component of the chip capacitor module has a capacitance within a range from 40 picofarads to 140 picofarads. If the at least one passive component refers to two or more capacitors, the capacitance of the at least one passive component refers to the equivalent or effective capacitance of the capacitors. The passive component also has a small major area that is less than 2.6 square millimetres. The major area refers to an area of a major surface or a top surface of the passive component. If the at least one passive component refers to two or more capacitors, the major area of the at least one passive component refers to the major area of each capacitor.

Since the chip capacitor module often has consistent and accurate capacitance, it enables the antennae of the inlay to function with consistent efficiency without the need of tuning the antennae after the inlay has been produced.

Furthermore, the chip capacitor module can cause the inductance or size of the antennae of the inlay to be substantially smaller while the antennae can be induced with sufficient RF energy for powering the electronic parts of the smart card. This small chip capacitor module also occupies a small part of the space of the inlay, thereby allowing the size of the opening of the metal layer to be smaller and increasing the metal portion of the metal chip card for making the chip card more solid and heavier.

The chip capacitor module also eliminates the use of an internal capacitive structure that can be found in other metal chip cards. The internal capacitive structure is often made by laying wires in parallel or by positioning layers of metal on top of each other, separated by a dielectric sheet. The internal capacitive structure often occupies a large area of the chip card, and it often has a capacitance that is less consistent due to variation of manufacturing processes.

The application provides a further improved chip card. The chip card includes a contactless chip card using direct connection technology. The contactless chip card comprises a metal layer comprising an opening that extends to an outer edge of the metal layer.

The chip card further comprises an inlay that is arranged in the opening. The inlay comprises a chip module and a card reader coupling antenna for inductively coupling to a reader antenna of an external card reader. The card reader coupling antenna is electrically connected to the chip module. The inlay also includes a chip capacitor module that is electrically connected to the card reader coupling antenna for enabling the card reader coupling antenna to resonate at a predetermined frequency. The chip capacitor module comprises at least one passive component for storing electrical energy, wherein the at least one passive component has a capacitance within a range from 40 picofarads to 140 picofarads and a major area that is smaller than 2.6 square millimetres.

Unlike the inlay of the first dual-interface chip card in which the card reader coupling antenna is electrically connected to the module coupling antenna that is inductively coupled with the chip module antenna, the card reader coupling antenna of the inlay of this contactless chip card is directly connected to the chip module that does not have an antenna.

The application also provides a further improved chip card. The chip card includes a second dual-interface chip card using direct connection technology. The second dual-interface chip card comprises a metal layer. The metal layer includes an opening that extends to an outer edge of the metal layer.

The chip card further includes a chip module and a contact interface that is electrically connected to the chip module for electrically connecting the chip module to an external card reader when the chip card is positioned in the external card reader.

The chip card further includes an inlay that is arranged in the opening. The inlay comprises a card reader coupling antenna for inductively coupling to a reader antenna of the external card reader. The card reader coupling antenna is electrically connected to the chip module of the card. The inlay further comprises a chip capacitor module that is electrically connected to the card reader coupling antenna for enabling the card reader coupling antenna to resonate at a predetermined frequency. The chip capacitor module comprises at least one passive component for storing electrical energy, wherein the at least one passive component has a capacitance within a range from 40 picofarads to 140 picofarads and a major area that is smaller than 2.6 square millimetres.

Regarding the above-mentioned chip cards, the passive component can have a capacitance within a range from 80 picofarads to 120 picofarads. This capacitance range is preferred for reducing the size and optimizing the RF performance of the card reader coupling antenna.

The passive component of the chip capacitor module can have a thickness that is smaller than 0.3 millimetres. The small thickness allows the passive component to be encapsulated in, for example, a COB package. For the above-mentioned contactless chip card using direct connection technology, the COB package can be sized such that its dimensions are similar to the dimensions of the chip module so that the chip capacitor module and the chip module can be processed with a similar process using the same equipment with little adjustment. This can simplify the production process for making the inlay of the contactless chip card.

The passive component can also have a thickness that is smaller than 0.6 millimetres. This allows the passive component having a larger size to be electrically connected directly to the card reader coupling antenna of the inlay of the chip card. This can eliminate the production cost for making the chip capacitor module comprising a package.

The contact interface of the respective above-mentioned chip cards can comprise a plurality of contact pads that are electrically connected to the chip module. The contact pads can conform to ISO standard 7816 and they can have six or eight electrically conductive pads.

The chip capacitor module of the respective above-mentioned chip cards can have a capacitance of about 100 picofarads (pf). The capacitance of chip capacitor module is essentially same as the capacitance of the passive component of the chip capacitor module. This chip capacitor module enables the card reader coupling antenna to be induced with more RF energy and causes a sufficient reduction in the size of the antenna. This can produce a metal chip card with a large metal portion and with sufficiently good RF performance.

In another implementation, the inlay of the respective above-mentioned chip cards further comprises an antenna carrying sheet for receiving the antennae of the inlay and the chip capacitor module.

The inlay of the respective above-mentioned chip cards can further comprise a thickness compensation sheet that is provided adjacent to the antenna carrying sheet.

The inlay of the respective above-mentioned chip cards can also comprise at least one overlay sheet that is provided adjacent to the thickness compensation sheet.

The inlay of the respective above-mentioned chip cards can further comprise at least one overlay sheet that is provided adjacent to the antenna carrying sheet.

The application also provides an improved inlay for a chip card.

The improved inlay includes a first inlay using inductive coupling technology.

The first inlay comprises a module coupling antenna for inductively coupling to a chip module antenna of a chip module of the chip card. This chip card can be a dual interface chip card, wherein the chip module with the chip module antenna is not part of the first inlay. The first inlay also includes a card reader coupling antenna for inductively coupling to a reader antenna of an external card reader. The card reader coupling antenna is electrically connected to the module coupling antenna for enabling signals to be transmitted between the card reader coupling antenna and the module coupling antenna. The first inlay further includes a chip capacitor module that is electrically connected to the card reader coupling antenna for enabling the card reader coupling antenna to resonate at a predetermined frequency. The chip capacitor module comprises at least one passive component for storing electrical energy, wherein the at least one passive component has a capacitance within a range from 40 picofarads to 140 picofarads and a major area that is smaller than 2.6 square millimetres.

The first inlay has a chip capacitor module with a consistent and accurate capacitance and the first inlay does not need tuning of its antennae after the first inlay has been produced. This chip capacitor module is substantially small, and it has a high capacitance that causes the antennae of the first inlay to be substantially small, thereby allowing an opening of a metal chip card for receiving the first inlay to be substantially small.

This can increase the size of the metal portion of the chip card, thereby making the metal chip card more solid and heavier.

The application also provides a further improved inlay for a chip card. The inlay includes a second inlay using direct connection technology.

This second inlay comprises a card reader coupling antenna for inductively coupling to a reader antenna of an external card reader. The card reader coupling antenna comprises terminals for electrically connecting to a chip module of the chip card. The chip card can be a dual interface chip card, wherein the chip module is not part of the second inlay. The second inlay also includes a chip capacitor module that is electrically connected to the card reader coupling antenna for enabling the card reader coupling antenna to resonate at a predetermined frequency. The chip capacitor module comprises at least one passive component for storing electrical energy, wherein the at least one passive component has a capacitance within a range from 40 picofarads to 140 picofarads and a major area that is smaller than 2.6 square millimetres.

The second inlay does not need tuning of its antennae after the second inlay has been produced. The second inlay is also substantially small which enables a more solid and heavier metal chip card to be produced.

In a special implementation in which the chip card is a contactless chip card using direct connection technology, this second inlay further comprises the chip module. The chip module is electrically connected to the terminals of the card reader coupling antenna for enabling the chip module to receive signals from the card reader coupling antenna directly. The electrical connection can include a galvanic connection but not be limited to the galvanic connection.

Regarding the first and the second inlay, the passive component can have a capacitance within a range from 80 picofarads to 120 picofarads. This capacitance range is preferred for reducing the size and optimizing the RF performance of the card reader coupling antenna.

The chip capacitor module of the first and second inlay can have a capacitance of about 100 picofarads (pf).

The first and second inlay can further comprise an antenna carrying sheet for receiving the antennae of the inlay and the chip capacitor module.

The first and second inlay can also comprise a thickness compensation sheet that is provided adjacent to the antenna carrying sheet.

The first and second inlay can further comprise at least one overlay sheet that is provided adjacent to the thickness compensation sheet.

The first and second inlay can also comprise at least one overlay sheet that is provided adjacent to the antenna carrying sheet.

The passive component of the first and second inlay can have a thickness that is smaller than 0.3 millimetres.

The passive component of the first and second inlay can also have a thickness that is smaller than 0.6 millimetres.

The application further provides a method for producing an inlay using inductive coupling technology. The method comprises a step of providing an antenna carrying sheet, followed by a step of providing the antenna carrying sheet with an opening by punching or milling. The opening is intended for receiving a chip capacitor module. The chip capacitor module is then inserted into the opening. An electrical wire is later laid onto the antenna carrying sheet to form a module coupling antenna and a card reader coupling antenna such that the card reader coupling antenna surrounds the chip capacitor module. The chip capacitor module is afterward be connected electrically to the card reader coupling antenna. The chip capacitor module comprises at least one passive component for storing electrical energy. The at least one passive component has a capacitance within a range from 40 picofarads to 140 picofarads and a major area that is smaller than 2.6 square millimetres.

The application also provides a plastic inlay for a dual interface plastic chip card using the inductive coupling technology. This plastic chip card does not have a metal layer and does not have an opening that can be found in a card body of a metal chip card. This chip card is often made of several layers of plastic laminated together. An example of this chip card is a credit card.

This plastic inlay comprises a module coupling antenna for inductively coupling to a chip module antenna of a chip module of the chip card and a card reader coupling antenna for inductively coupling to a reader antenna of an external card reader. The card reader coupling antenna is integrally connected to the module coupling antenna. This plastic inlay further includes a chip capacitor module. The chip capacitor module is electrically connected to the card reader coupling antenna for enabling the card reader coupling antenna to resonate at a predetermined frequency. The chip capacitor module comprises at least one passive component for storing electrical energy. The at least one passive component has a capacitance within a range from 40 picofarads to 140 picofarads and a major area that is smaller than 2.6 square millimetres.

This plastic inlay has an antenna that has a consistent efficiency since the chip capacitor module has an accurate and consistent capacitance. The antenna of this plastic inlay hence does not need tuning. This can reduce the production steps of this plastic inlay and hence the production cost of this plastic inlay.

Furthermore, this plastic inlay has a large unoccupied space because the chip capacitor module is relatively small. The large unoccupied space can be used for incorporating additional functionality and design features, which may not be available on the other inlays that have limited unoccupied space.

The passive component of the plastic inlay can have a capacitance within a range from 80 picofarads to 120 picofarads. This capacitance range is preferred for reducing the size and optimizing the RF performance of the card reader coupling antenna.

In one implementation, the chip capacitor module of this plastic inlay has a capacitance of about 100 picofarads (pf).

The card reader coupling antenna of this plastic inlay can comprise a plurality of essentially rectangular wire loops that are positioned next to the outer edges of this plastic inlay.

The rectangular wire loops can have a size that is substantially the same as the size of this plastic inlay. The rectangular wire loops can also have a size that is about half of the size of this plastic inlay or that is about two-thirds of the size of this plastic inlay.

The passive component of this plastic inlay can have a thickness that is smaller than 0.3 millimetres.

The passive component of this plastic inlay can also have a thickness that is smaller than 0.6 millimetres.

The chip capacitor module can further comprise a metal substrate comprising a major inner surface that receives the passive component. The metal substrate further comprises a major outer surface that is opposite the inner surface. The outer surface is provided with a unique visible feature. This visible feature is often etched from the outer surface of the metal substrate. This unique visible feature can act as a security feature when it is arranged to be visible to a card user so that the card user can distinguish an authentic chip card having this unique security feature from other chip cards without the same security feature.

Within the plastic inlay and the chip card, the chip capacitor module can be arranged in a transparent window so that the security feature is visible.

In one implementation, the unique visible feature comprises at least one member selected from a group consisting of text and a pattern. An example of the pattern is a logo.

The application further provides a dual interface plastic chip card. This chip card comprises the plastic inlay mentioned above and a chip module with a chip module antenna. This chip card further comprises a plurality of contact pads that are electrically connected to the chip module. The chip module antenna is adapted to be inductively coupled to a module coupling antenna of the plastic inlay.

This plastic chip card has an antenna that has a consistent efficiency such that the antenna does not need tuning after production.

The plastic chip card can further comprise a plurality of plastic flat sheets. The plastic sheets are arranged in a stack such that the plastic inlay is positioned between the plastic sheets. The plastic sheets comprise a transparent portion. The transparent portion is adapted such that a user can view, through the transparent portion, a visible feature that is provided on a major outer surface of a metal substrate of a chip capacitor module of the plastic inlay. The transparent portion acts to allow the card user to use the visible feature to distinguish an authentic chip card having this visible feature from other chip cards without the same visible feature.

The application further provides a tag inlay for an electronic device, which is powered by electrical energy. The tag inlay comprises a chip module and a reader coupling antenna for inductively coupling to a reader antenna of an external reader. The reader coupling antenna is electrically connected to the chip module. The tag inlay further comprises a chip capacitor module that is electrically connected to the reader coupling antenna for enabling the reader coupling antenna to resonate at a predetermined frequency. The chip capacitor module comprises at least one passive component for storing electrical energy. The at least one passive component has a capacitance within a range from 40 picofarads to 140 picofarads and a major outer surface area that is smaller than 2.6 square millimetres.

This tag inlay has an antenna that has a consistent efficiency such that the antenna does not need tuning before use. Furthermore, this tag inlay has a small size because the sizes of the reader coupling antenna and the chip capacitor module are also small. This tag inlay is hence suitable for making a small wireless tag.

The passive component of the tag inlay can have a capacitance within a range from 80 picofarads to 120 picofarads. This capacitance range is preferred for reducing the size and optimizing the RF performance of the reader coupling antenna.

The chip capacitor module of the tag inlay can have a capacitance of about 100 picofarads (pf).

In one implementation, the passive component of the tag inlay has a thickness that is smaller than 0.3 millimetres. In another implementation, the passive component has a thickness that is smaller than 0.6 millimetres.

The chip capacitor module of the tag inlay can further comprise a metal substrate that receives the passive component. The metal substrate comprises a major outer surface that is provided with a visible feature.

The visible feature can comprise at least one member selected from a group consisting of text and a pattern.

The application further provides a wearable electronic device, such as a wearable fitness tracker. The wearable device comprises the tag inlay mentioned above.

The application also provides an electronic data page for a passport. The electronic data page contains information about a user of the passport. The data page comprises a plurality of plastic sheets and the above-mentioned tag inlay. The plastic sheets are arranged in a stack such that the inlay is positioned between the plastic sheets. The plastic sheets and the inlay comprise a transparent portion next to a chip capacitor module of the tag inlay such that a user can view the visible feature of the tag inlay, which is provided on an outer surface of the chip capacitor module.

BRIEF DESCRIPTION OF THE FIGURES

FIG. 13 illustrates a comparison between the antenna unit of FIG. 12 and antennae of other inlays.

DETAILED DESCRIPTION

In the following description, details are provided to describe embodiments of the application. It shall be apparent to one skilled in the art, however, that the embodiments may be practiced without such details.

Some parts of the embodiments have similar parts. The similar parts may have the same names or similar part numbers with an alphabet symbol. The description of one similar part also applies by reference to another similar part, where appropriate, thereby reducing repetition of text without limiting the disclosure.

Figure 1:
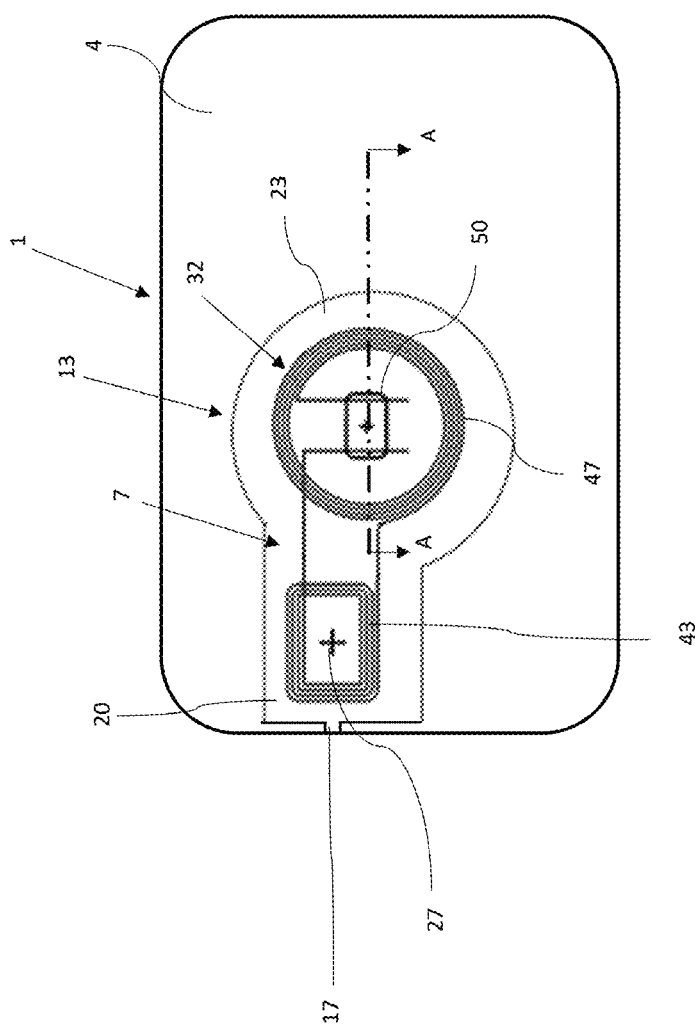
FIG. 1 illustrates a top view of a dual-interface smart card comprising an inlay that includes an antenna unit.
Figure 2:
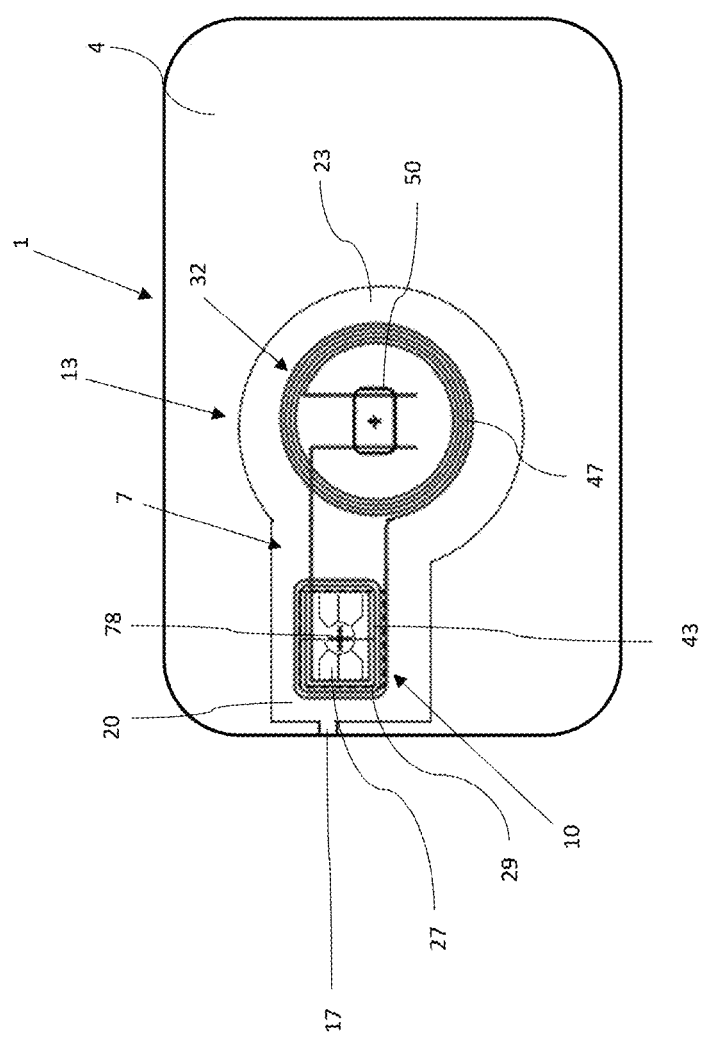
FIG. 2 illustrates the dual-interface smart card of FIG. 1, wherein the smart card further comprises a contact interface and a smart card integrated circuit (IC) module with a chip module antenna that is inductively coupled to the antenna unit.

FIGS. 1 and 2 show a dual interface smart card 1 using inductive coupling technology. The smart card 1 is configured to wirelessly connect to an external or remote card acceptance device, such as a card reader.

The smart card 1 includes a card body 4, a smart card integrated circuit (IC) module 10, an inductive coupling inlay 13, and a contact-based interface 78. As better seen in FIG. 2, the smart card IC module 10 is electrically connected to the contact-based interface 78 and is inductively coupled to the inlay 13.

The card body 4 is made of a layer of metal having a substantially rectangular shape. The metal body 4 has an opening 7 and a slot 17 that extends from the opening 7 to an outer edge of the metal body 4. The inductive coupling inlay 13 is placed in the opening 7.

The opening 7 of the metal body 4 includes a coupling aperture portion 20 and an antenna aperture portion 23, which is connected to the coupling aperture portion 20. The coupling aperture portion 20 is connected to an end of the slot 17. In this example, the coupling aperture portion 20 has a substantially rectangular shape while the antenna aperture portion 23 has a shape of a truncated circle with a straight edge. The straight edge is connected to the rectangular coupling aperture portion 20.

The smart card IC module 10 includes a microelectronic chip 27 and a chip module antenna 29. The chip module antenna 29 is electrically connected to output pads of the microelectronic chip 27. The chip module antenna 29 refers to a metal-etched antenna comprising one or more turns or windings.

Figure 3:
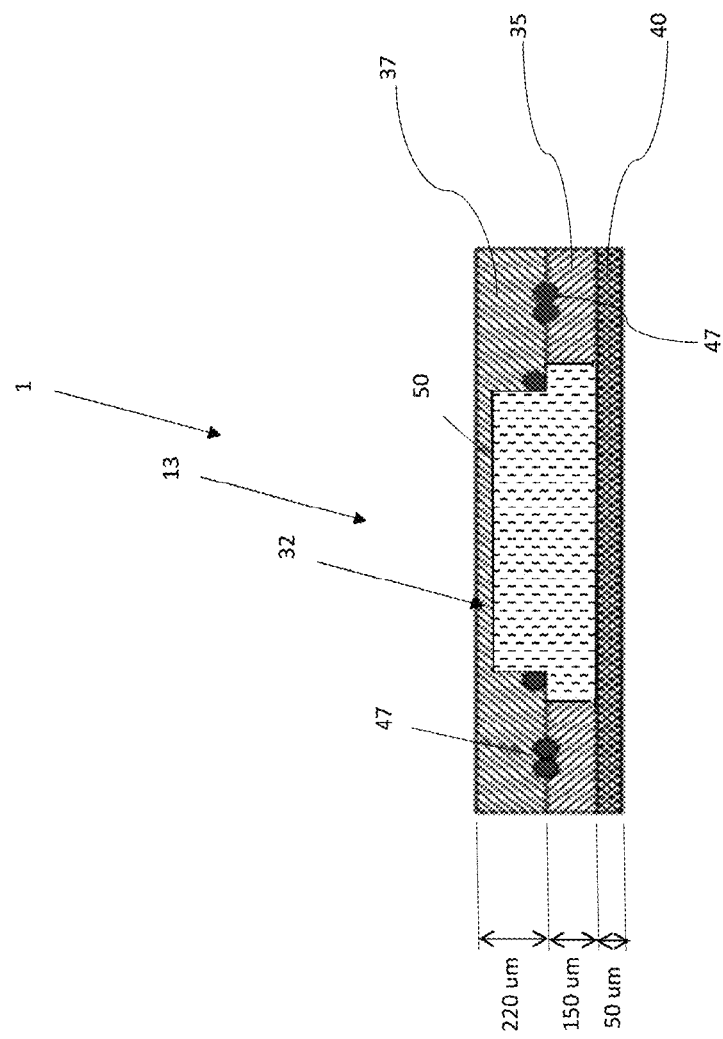
FIG. 3 illustrates a cross-sectional view of a portion of the inlay of the smart card along the line AA of FIG. 1, the portion including the antenna unit.

The inlay 13 includes an antenna unit 32, an antenna carrying sheet 35, a thickness compensation sheet 37, and an overlay sheet 40. The antenna unit 32, the antenna carrying sheet 35, the thickness compensation sheet 37, and the overlay sheet 40 are better seen in FIG. 3. The antenna unit 32 is embedded into the antenna carrying sheet 35, which is placed between the thickness compensation sheet 37 and the overlay sheet 40. The antenna carrying sheet 35 is also called a substrate. In one implementation, the antenna carrying sheet 35 has a thickness of about 150 micrometres (um), the thickness compensation sheet 37 has a thickness of 200 um, and the overlay sheet 40 has a thickness of about 50 um.

In another embodiment, the inlay 13 further includes a first plastic sheet that is placed next to the overlay sheet 40 and a second plastic sheet that is placed next to the thickness compensation sheet 37.

The antenna unit 32 comprises a module coupling antenna 43, a card reader coupling antenna 47, and a chip capacitor module 50. The card reader coupling antenna 47 is electrically or integrally connected to the module coupling antenna 43. The card reader coupling antenna 47 is also electrically connected to the chip capacitor module 50. The module coupling antenna 43 is inductively coupled to the chip module antenna 29.

The module coupling antenna 43 is arranged in the coupling aperture portion 20 of the opening 7. The card reader coupling antenna 47 is arranged in the antenna aperture portion 23 of the opening 7.

The module coupling antenna 43 and the card reader coupling antenna 47 are formed using an electrical wire. The electrical wire can be copper, aluminium, silver, or an alloy of at least two of aluminium, silver, or copper. The electrical wire can be insulated with lacquer.

The module coupling antenna 43 is a coil comprising one or more turns of the electrical wire. In this example, the coil has a substantially rectangular shape that is smaller than the rectangular shape of the coupling aperture portion 20. Put differently, the coil is separated from the edges of the coupling aperture portion 20 by a gap.

The card reader coupling antenna 47 is also a coil comprising one or more turns of the electrical wire. In this example, the coil has a substantially circular shape that is smaller than the truncated circular shape of the antenna aperture portion 23. Put differently, the circular coil is separated from arcs of the antenna aperture portion 23 by a gap. The circular coil includes two end terminals of the electrical wire, which are positioned near the center of the circular coil.

The chip capacitor module 50 is galvanically connected to the two end terminals of the card reader coupling antenna 47 such that the module coupling antenna 43, the card reader coupling antenna 47, and the chip capacitor module 50 are connected in series to form an electrical loop. The galvanic connection can be done using thermocompression bonding, conductive glue, or soldering.

The chip capacitor module 50 includes a metal substrate with a discrete ceramic capacitor and a plastic package that encapsulates the substrate with the ceramic capacitor. The plastic package can be provided in the form of a surface-mount device (SMD) package or a chip on board (COB) package that is made of one or more resin layers. The ceramic capacitor generally includes at least two electrical conductors that are separated by a ceramic dielectric layer.

In one implementation, the chip capacitor module 50 has a length of about 8 mm and a width of about 5 mm comprising a ceramic capacitor having a shape of a rectangular block with a length of about 0.4 mm, a width of about 0.2 mm, and a thickness of about 0.2 mm that is less than 0.3 mm. The ceramic capacitor has a capacitance of 100 picofarads (pf) with a tolerance of +−5 pf.

In another implementation, the chip capacitor module 50 includes only a ceramic capacitor which is galvanically connected to the end terminals of the card reader coupling antenna 47. This ceramic capacitor has a shape of a rectangular block with a length of about 1.6 mm, a width of about 0.8 mm, and a thickness of about 0.5 mm that is less than 0.6 mm. This ceramic capacitor has a capacitance of 100 pf with a tolerance of +−5 pf.

Figure 4:
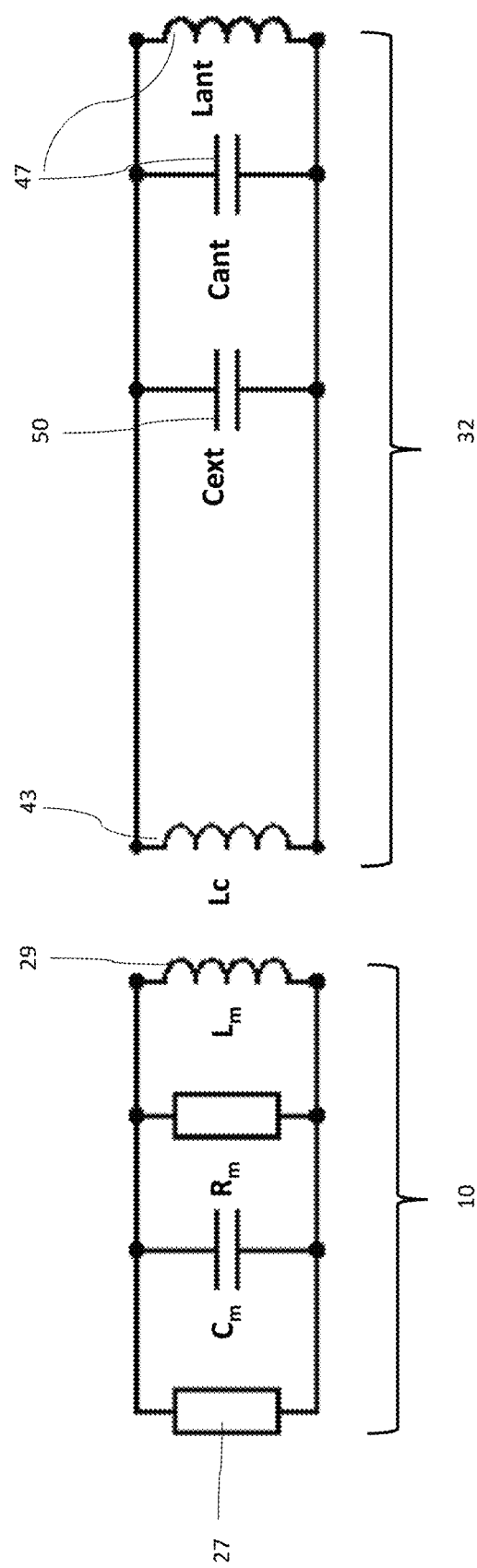
FIG. 4 illustrates an equivalent electric circuit of the antenna unit that is inductively coupled to the smart card IC module of the smart card of FIG. 1.

FIG. 4 shows an equivalent electric circuit of the antenna unit 32. The antenna unit 32 is a resonant circuit that is configured to resonate at a predetermined frequency, at which the efficiency or the RF performance of the antenna unit 32 is optimized or maximized. The resonant frequency is about 13.56 megahertz (Mhz). The resonant frequency is essentially related to the inductance and the capacitance of the antenna unit 32. The inductance of the antenna unit 32 is relating to the size of the antenna unit 32. The capacitance of the antenna unit 32 is substantially determined by the capacitance of the chip capacitor module 50, which is denoted by the symbol "Cext" in FIG. 4.

At the resonant frequency, the impedance of the inductance of the antenna unit 32 essentially equals the impedance of the capacitance of the chip capacitor module 50. The relationship between the impedance of the capacitance and the impedance of the inductance can be expressed according to the equation below:

$$Cext = \frac{1}{(2\pi fres)^2 L}$$

where Cext is the capacitance of the chip capacitor module,

L is the inductance of the antenna unit, and fres is the resonant frequency.

This means the inductance of the antenna unit 32 is inversely proportional to the capacitance of the chip capacitor module 50. The smaller the inductance, the larger the capacitance, and vice versa. The larger the inductance, the number of turns or windings of an electrical wire required for forming the antenna increases, and the size of the antenna is hence larger. The smaller the inductance, the number of turns of an electrical wire required for forming the antenna decreases, and the size of the antenna is hence smaller.

Since the ceramic capacitor of the chip capacitor module 50 has a relatively small size even if its capacitance is relatively large, the chip capacitor module 50 occupies only a small part of the space that the inlay 13 occupies. The antenna unit 32 can hence be made relatively small having a small inductance and a large capacitance. The size of the opening 7 of the metal body 4 can then be made smaller, thereby increasing the size of the metal portion of the card body 4.

However, if the inductance of the antenna unit 32 is too small, the antenna unit 32 may not be induced with enough RF energy for powering the electronic parts of the smart card 1. The capacitance of the chip capacitor module 50 hence cannot be larger than a predetermined upper value. On the other hand, the capacitance of the chip capacitor module 50 is preferred to be as large as possible to reduce the size of the opening 7 as much as possible. The capacitance hence cannot be smaller than a predetermined lower value.

It has been evaluated that the ceramic capacitor of the chip capacitor module 50 can be selected such that it has a capacitance that is within a range between 40 picofarads (pf) and 140 pf. The capacitance of the chip capacitor module 50 is essentially the same as the capacitance of the ceramic capacitor.

For a more optimized antenna unit 32, the ceramic capacitor is preferably selected such that it has a capacitance that is within a range between 80 pf and 120 pf. The lower limit of the capacitance range is increased to reduce the size of the antenna unit 32 for causing the opening 7 of the metal body 4 to be smaller. The upper limit of the capacitance range is decreased to improve the RF performance of the antenna unit 32.

In one implementation, the chip capacitor module 50 has a capacitance of 100 pf with a tolerance of +−5 pf. The antenna unit 32 with this chip capacitor module 50 has an optimal RF performance and causes the opening 7 of the metal body 4 to be substantially small.

In use, the card reader coupling antenna 47 is used for inductively coupling to a reader antenna of an external card reader. The card reader transmits radio signals with the resonant frequency to the card reader coupling antenna 47. The card reader coupling antenna 47 then receives the signals and transfers the received signals to the module coupling antenna 43. The module coupling antenna 43 later receives the signals and transmits the received signals to the chip module antenna 29 of the smart card IC module 10 through inductive coupling. The chip module antenna 29 afterward transmits the received signals to the microelectronic chip 27 of the smart card IC module 10. The microelectronic chip 27 then converts the radio signals into electrical signals for powering the microelectronic chip 27 and/or for processing the electrical signals.

Similarly, the microelectronic chip 27 acts to convert data into radio signals for transmitting to the chip module antenna 29, to the module coupling antenna 43, to the card reader coupling antenna 47, to the antenna of the card reader, and to the card reader for processing.

The slot 17 acts to remove any conductive loop around the opening 7 of the metal body 4, thereby preventing eddy currents from flowing in a closed loop surrounding the opening 7 in the metal body 4. This allows sufficient magnetic field strength to be present for the antenna unit 32 of the inlay 13 to operate.

The contact-based interface 78 is compliant with the standard International Organization for Standardization (ISO)/International Electrotechnical Commission (IEC) 7816. The contact-based interface 78 includes a plurality of contact pads that are electrically connected to the microelectronic chip 27. The contact pads are configured to touch the contact pins of a card reader when the smart card 1 is placed into the card reader. The contacting acts to electrically connect the microelectronic chip 27 to the card reader to allow energy and data to be transmitted between the card reader and the microelectronic chip 27.

Figure 5:
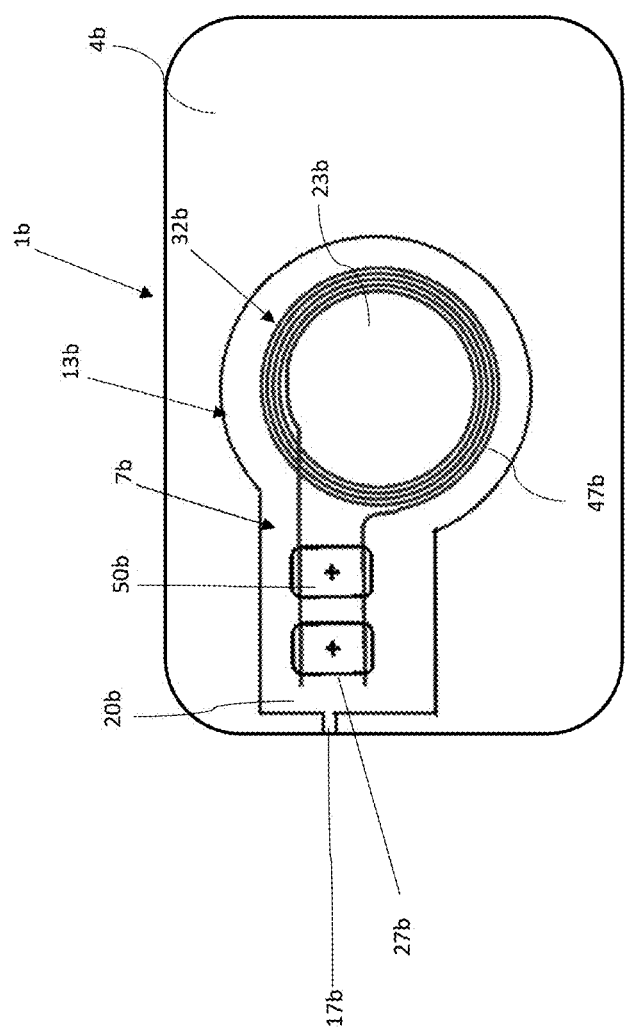
FIG. 5 illustrates a top view of a contactless smart card comprising an inlay that includes a smart card IC module and an antenna unit being electrically connected to the smart card IC module.

FIG. 5 shows a contactless smart card 1b using direct connection technology. The smart card 1b is a variant of the smart card 1. The smart card 1b includes parts that are similar to the corresponding parts of the smart card 1 in terms of arrangements and functional relationships.

Briefly, the contactless smart card 1b comprises a metal body 4b with an opening 7b and a direct connection inlay 13b. The inlay 13b is arranged in the opening 7b.

Figure 6:
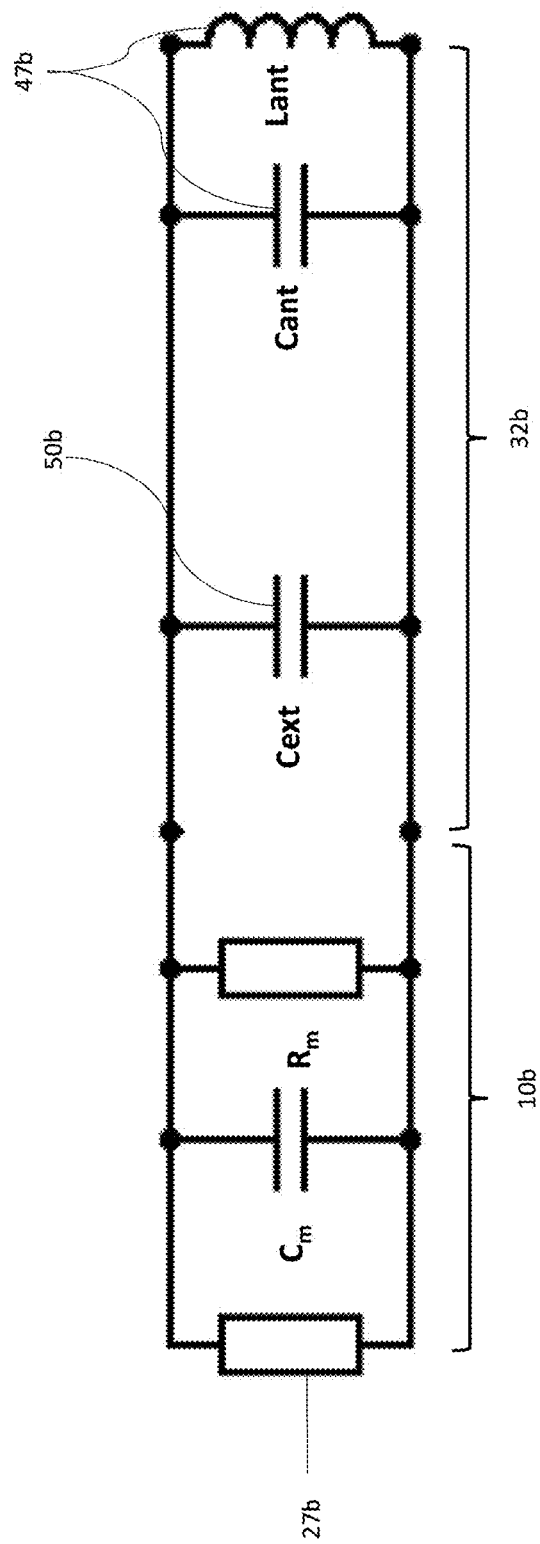
FIG. 6 illustrates an equivalent electric circuit of the antenna unit of the smart card of FIG. 5.

The direct connection inlay 13b is different from the inductive coupling inlay 13 of the smart card 1. In detail, the inlay 13b comprises a microelectronic chip 27b, a card reader coupling antenna 47b, and a chip capacitor module 50b. The chip capacitor module 50b is electrically connected to the card reader coupling antenna 47b, which is also electrically connected to the microelectronic chip 27b. The equivalent electric circuit of the inlay 13b is shown in FIG. 6. The chip capacitor module 50b can be provided in a COB package having dimensions that are similar to the dimensions of the microelectronic chip 27b so that the chip capacitor module 50b and the microelectronic chip 27b can be processed in a similar manner using the same equipment during production.

Figure 7:
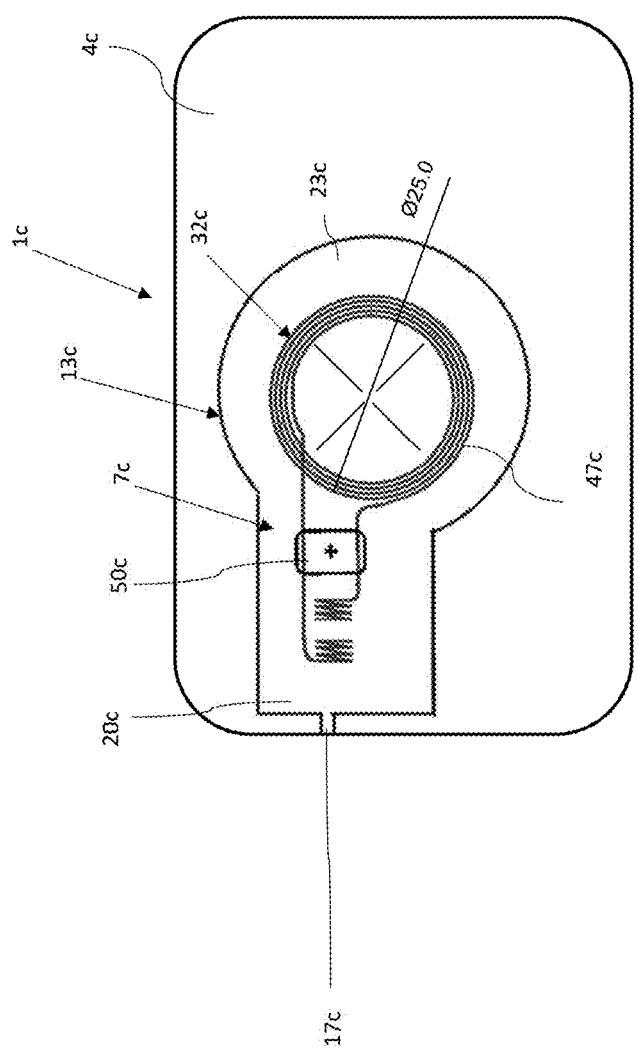
FIG. 7 illustrates a top view of a dual-interface smart card comprising an inlay that includes an antenna unit with two terminals.
Figure 8:
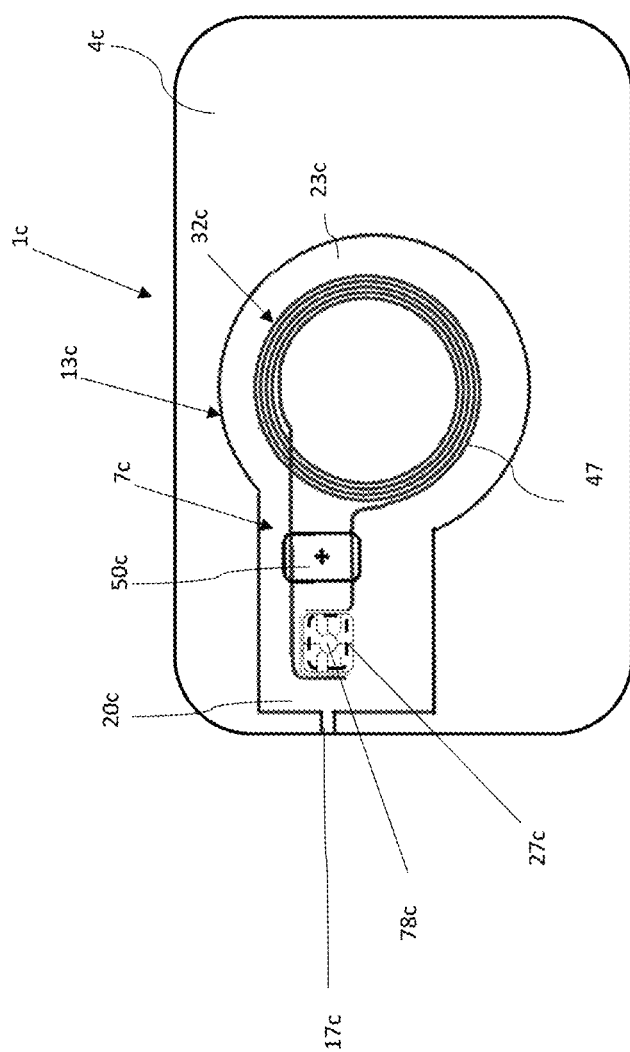
FIG. 8 illustrates a top view of the dual-interface smart card of FIG. 7, wherein the smart card further comprises a contact interface and a smart card IC module that is electrically connected to the terminals of the antenna unit.

FIGS. 7 and 8 show a dual-interface smart card 1c using direct connection technology. The smart card 1c is another variant of the smart card 1. The parts of the smart card 1c and the parts of the dual-interface smart card 1 have similar arrangements and functional relationships.

Briefly, the dual-interface smart card 1c comprises a metal body 4c with an opening 7c, a microelectronic chip 27c, a direct connection inlay 13c, and a contact-based interface 78c. The microelectronic chip 27c and the contact-based interface 78c are shown in FIG. 8. The inlay 13c is arranged in the opening 7c. The microelectronic chip 27c is electrically connected to the inlay 13c and to the contact-based interface 78c.

This direct connection inlay 13c comprises a card reader coupling antenna 47c and a chip capacitor module 50c that is electrically connected to the card reader coupling antenna 47c. The card reader coupling antenna 47c has two terminals that are electrically connected to the microelectronic chip 27c that is not part of the inlay 13c.

Figure 9:
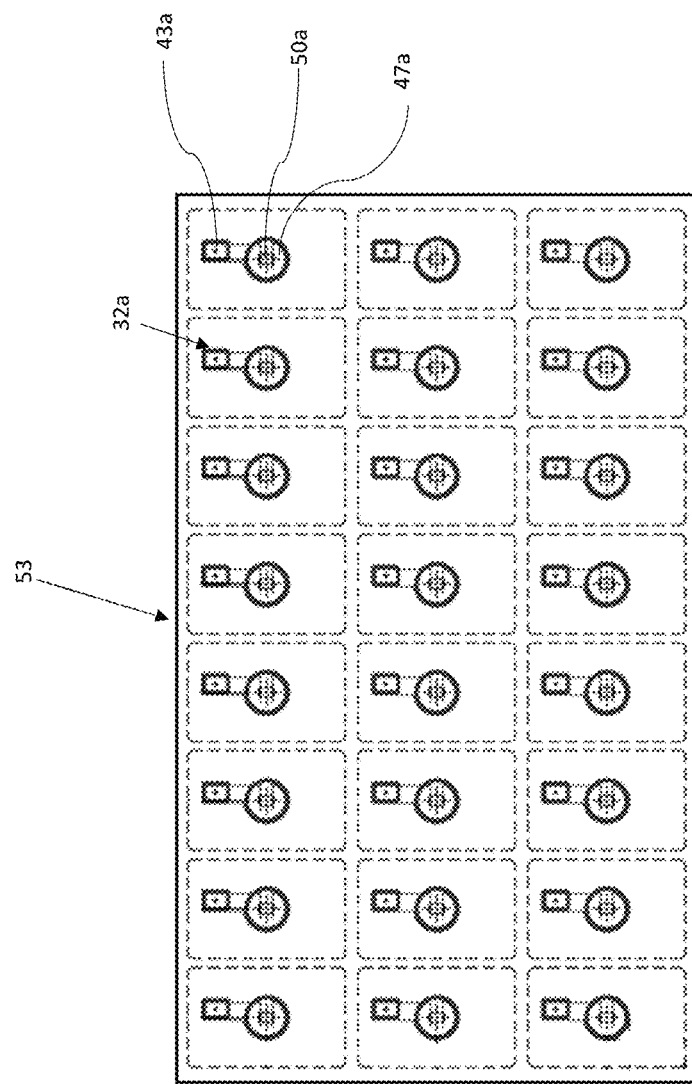
FIG. 9 illustrates an inlay sheet with multiple antenna units of FIG. 1.

FIG. 9 shows an inlay sheet 53 comprising a plurality of card transponders, wherein each transponder is similar to the above-mentioned antenna unit 32 of the dual-interface smart card 1. The card transponders are arranged in a matrix. The inlay sheet 53 is produced according to a method described below.

Figure 10:
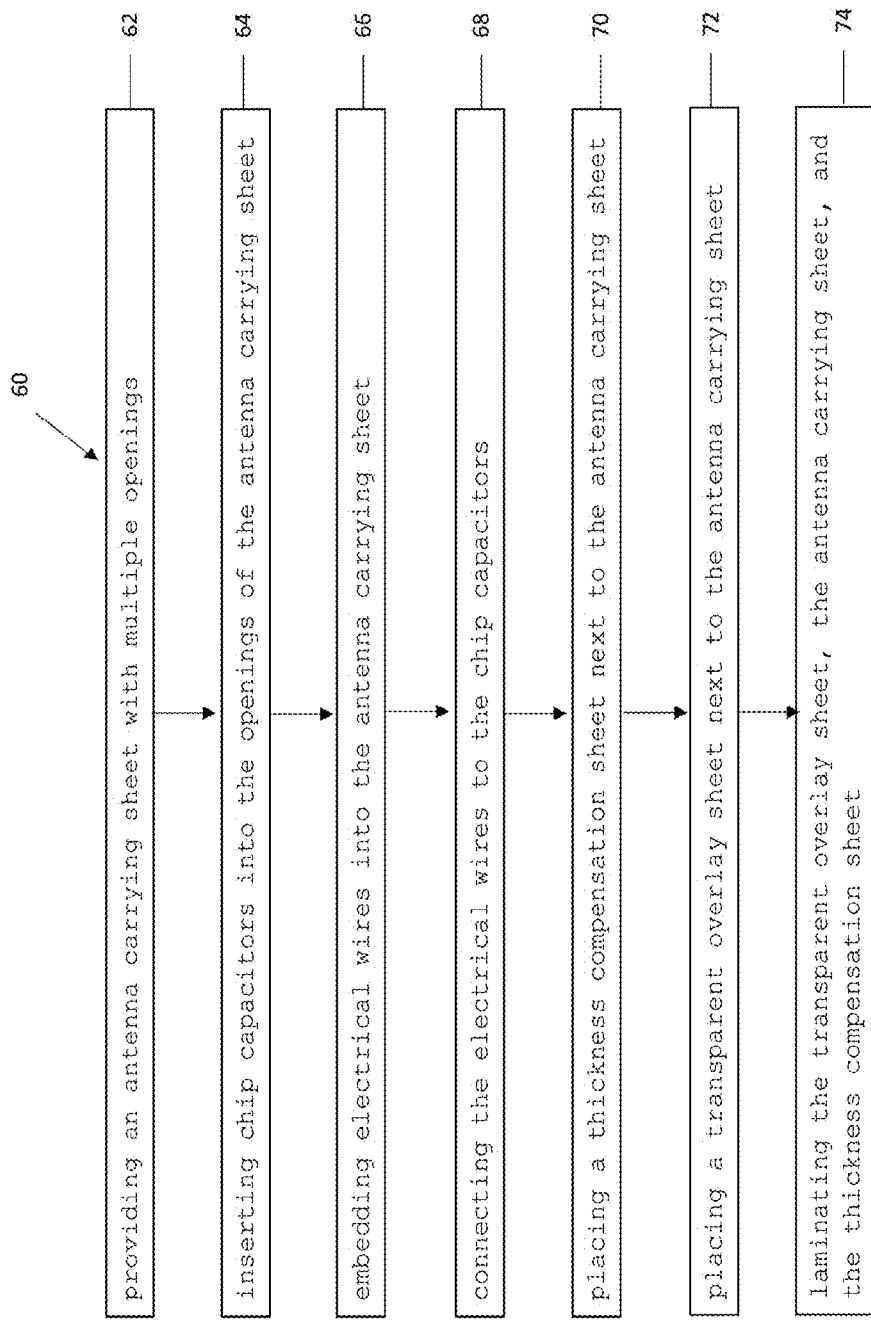
FIG. 10 illustrates a flow chart of a method for producing the inlay sheet of FIG. 9.

FIG. 10 shows a flow chart 60 of a method for producing the inlay sheet 53.

The method includes a step 62 of providing an antenna carrying sheet 35.

After this, the antenna carrying sheet 35 is milled, cut, or punched to provide the antenna carrying sheet 35 with a plurality of openings at predetermined positions. Each opening is intended for receiving a chip capacitor module 50.

An adhesive tape is then placed next to the antenna carrying sheet 35 such that the antenna carrying sheet 35 is attached to an adhesive layer of the adhesive tape.

The antenna carrying sheet 35 is later placed on a supporting surface, wherein the adhesive tape is resting on the supporting surface. This is to allow easy placement of chip capacitor modules 50 into the openings of the antenna carrying sheet 35.

The chip capacitor modules 50, which are produced separately, are afterward respectively inserted into the respective corresponding openings, wherein the chip capacitor module 50 is attached to the adhesive tape in a step 64.

A plurality of electrical wires is later respectively laid onto the antenna carrying sheet 35 to form a module coupling antenna 43 and a card reader coupling antenna 47 of each antenna unit 32. The card reader coupling antenna 47 of each antenna unit 32 surrounds a corresponding chip capacitor module 50. The embedding fixes the electrical wires to the antenna carrying sheet 35, in a step 66. In a subsequent step 68, the electrical wires are afterward connected to the chip capacitor modules 50 via, for example, galvanic connections.

A thickness compensation sheet 37 is then placed on top of the antenna carrying sheet 35 such that the thickness compensation sheet 37 presses upper parts of the chip capacitor modules 50 and the electrical wires, in a step 70.

The adhesive tape is afterward removed from the antenna carrying sheet 35.

An overlay sheet 40 is afterward provided below the antenna carrying sheet 35. The overlay sheet 40 touches the antenna carrying sheet 35, in a step 72.

After this, the overlay sheet 40, the antenna carrying sheet 35, and the thickness compensation sheet 37 are then laminated, wherein these sheets are pressed against each other to form the inlay sheet 53, in a step 74.

The method can include a further step of providing a first plastic sheet next to the overlay sheet 40. The first plastic sheet then touches the overlay sheet 40.

The method can also include another further step of providing a second plastic sheet next to the thickness compensation sheet 37. The first plastic sheet then touches the thickness compensation sheet 37.

Different implementations of the antenna units 32, 32b, and 32c are possible. The chip capacitor module 50, 50b, and 50c can include two or more discrete capacitors arranged in parallel. The chip capacitor module 50, 50b, and 50c may be any discrete capacitor that can be provided in a package. The discrete capacitor can also be electrically connected directly to the card reader coupling antenna 47, 47b, and 47c of the antenna unit 32, 32b, and 32c.

The inlay 13, 13b, and 13c may include a different number of layers, which are arranged in a stack. The parts of the inlay 13, 13b, and 13c may also be arranged differently to simplify its manufacturing process.

The opening 7, 7b, and 7c of the metal body 4, 4b, and 4c can have different geometries. In one implementation, the coupling aperture portion of the opening has a shape of a square while the antenna aperture portion of the opening has a shape of a rectangle.

Figure 11:
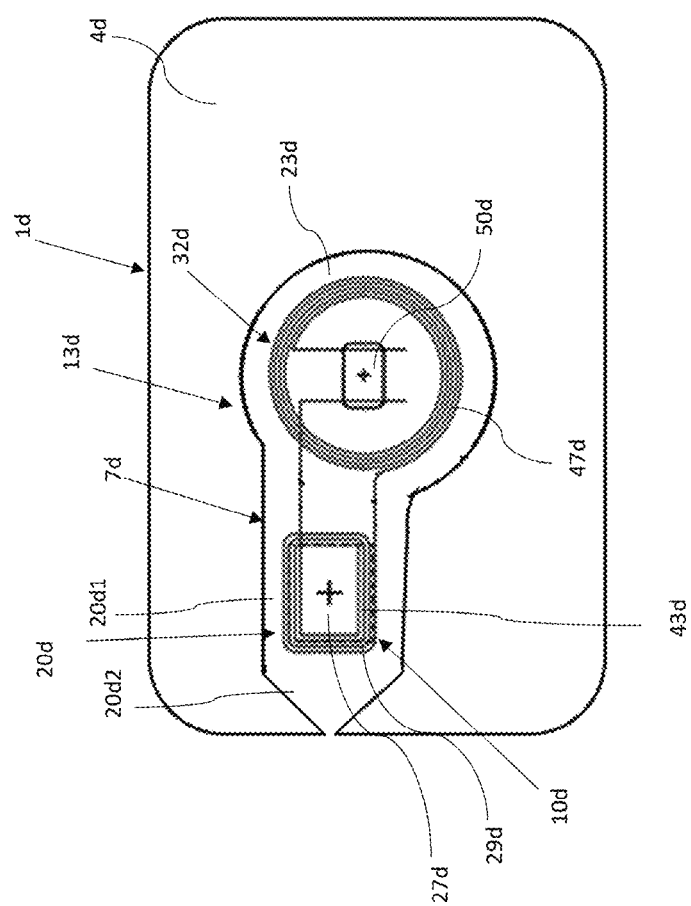
FIG. 11 illustrates a top view of a dual-interface smart card, which is a variant of the smart card of FIG. 1.

Another embodiment is shown in FIG. 11, which illustrates a dual-interface smart card 1d having an opening 7d with a different shape. The opening 7d comprises a coupling aperture portion 20d and an antenna aperture portion 23d, which is connected to the coupling aperture portion 20d. The size of the antenna aperture portion 23d is essentially the same as the size of the antenna aperture portion 23 of the above-mentioned smart card 1. The coupling aperture portion 20d includes a rectangular part 20d1 and a triangular part 20d2. The rectangular part 20d1 is connected to the antenna aperture portion 23d. A base of the triangular part 20d2 is connected to the rectangular part 20d1 while a truncated vertex which is opposite the base of the triangular part 20d2 touches an outer edge of the metal body 4d. The aperture portion at the truncated vertex acts as a slot of the smart card 1 described above.

The smart card 1d further includes an inductive coupling inlay 13d, which is similar to the other inductive coupling inlay 13 and 13a mentioned above.

Briefly, the inductive coupling inlay 13d includes an antenna unit 32d which comprises a module coupling antenna 43d, a card reader coupling antenna 47d, and a chip capacitor module 50d.

Figure 12:
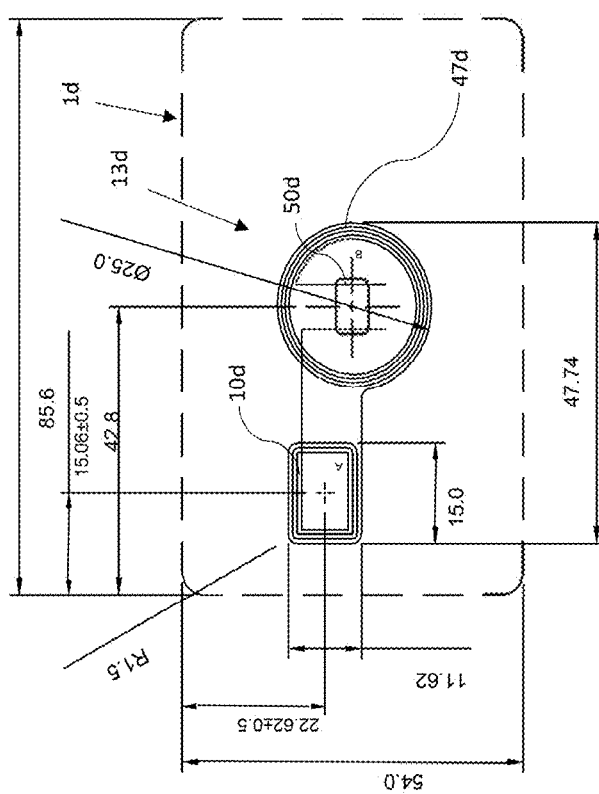
FIG. 12 illustrates dimensions of an antenna unit of the smart card of FIG. 11.

Better seen in FIG. 12, the module coupling antenna 43d has a rectangular shape having a length of about 15 millimetres (mm) and a width of about 11.62 mm while the card reader coupling antenna 47d has a shape of a circle with a diameter of about 25 mm. The card reader coupling antenna 47d is integrally connected to the module coupling antenna 43d via insulated wires. The chip capacitor module 50d is connected to two terminals of the card reader coupling antenna 47d, wherein the terminals are positioned within an inner space of the circular card reader coupling antenna 47d. The chip capacitor module 50d has a shape of a rectangular block with a length of about 8 mm and a width of about 5 mm. The antenna unit 32d occupies an area of about 754 square millimetres (mm2), including areas occupied by the two antennae 43d and 47d and a space occupied by the insulated wires that are placed between the module coupling antenna 43d and the card reader coupling antenna 47d.

Compared to an outer coil antenna of another inductive coupling card inlay, the size of the antenna unit 32d is substantially smaller. The antenna unit 32d occupies an area of about 754 mm2 while the coil antenna of the other card inlay can occupy an area of more than 2800 mm2 as shown in FIG. 13. This is because the other inductive coupling card inlay often has a resonant capacitor with a small capacitance. The resonant capacitor is made of insulated wires or insulated layers of etched metals which are in parallel to each other and it is difficult to make such a resonant capacitor with a large capacitance. A large antenna having a large inductance is thus needed to form an LC resonant circuit that operates at a predetermined resonant frequency of about 13.56 megahertz.

Consequently, the openings of the smart cards 1 and 1d for receiving the inductive coupling inlays are small in size. The smart cards 1 and 1d respectively hence have a larger metal portion compared to other metal cards. These smart cards are therefore heavier.

These smart cards 1 and 1d cannot be easily bent as there is more metal and a larger bending force is needed. In addition, the bonding area between the metal portion and the plastic sheet covering the metal card body is large, thereby providing a card that is more mechanically stable and stiffer.

In summary, the improved contactless smart cards and dual-interface smart cards provide several benefits.

The chip capacitor module of the improved inlays, which is produced externally for assembling of the inlay, has consistent and accurate capacitance, thereby enabling the antenna of the inlay to have a consistent efficiency without the need of tuning the antenna after assembly of the inlays. This reduces the total production cost of the inlays.

The chip capacitor module also eliminates the use of internal capacitive structures in other inlays in which wired antennae and the internal capacitive structures are made using insulated wires or in which etched antennae and the internal capacitive structures are made using multiple insulated layers of etched metals. The internal capacitive structures are made by laying wires in parallel or by positioning layers of metal on top of each other, separated by a dielectric sheet. Such an internal capacitive structure often occupies a larger space. Furthermore, the forming of a wire capacitor often needs highly accurate wire embedding equipment operating at a slower rate for high precision placement of the wires.

Furthermore, the improved inlay is small in size. This allows the size of the opening of the smart card which receives the improved inlay to be also small. The metal portion of the smart card can hence become larger, thereby allowing the smart card to be more solid and heavier and providing a feel of more exclusive and a prestigious image to a user of the card.

The use of the external chip capacitor module also enhances the efficiency of the improved smart card. This is easier for the improved smart card to be certified for meeting specific RF performance, which is required for cards to be used, for example, for banking and government-related transactions.

Moreover, the use of the discrete capacitors allows the manufacturer of the smart card to use standard smart card ICs that are also used for non-metal cards, leading to easier inventory management.

Figure 14:
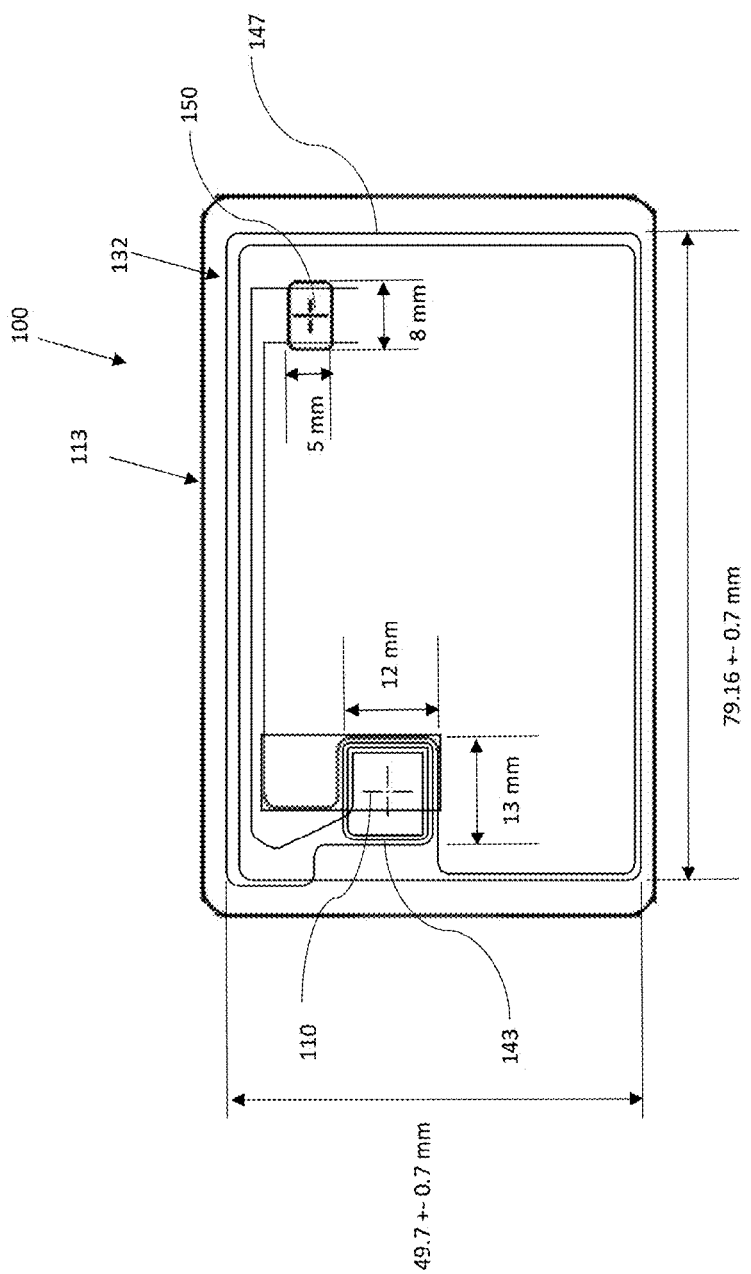
FIG. 14 illustrates a top view of a non-metal dual-interface smart card with a full-size antenna unit.

The application also provides a non-metal dual interface smart card 100 with a full-size antenna, which is shown in FIG. 14. The card 100 does not have a metal layer with an opening. Instead, it is made of plastic material.

The card 100 includes an inlay 113, a plurality of plastic flat sheets, and a plurality of electronic modules.

The inlay 113 and the flat sheets have essentially the same rectangular shape. The inlay 113 and the flat sheets are arranged in a stack, wherein an outer edge of the inlay 113 is placed next to the outer edges of the flat sheets. The inlay 113 is positioned between the flat sheets. The electronic modules are embedded in the flat sheets and the inlay 113. As the parts of the card 100 are known in the prior art, only certain parts will be described below for simplicity.

The inlay 113 includes a coil antenna unit 132, which is inductively coupled to a smart card IC module 110 of the smart card 100, which is an electronic module embedded in the flat sheets. The smart card IC module 110 can include a microelectronic chip with a chip module antenna. The microelectronic chip is electrically connected to a plurality of contact pads of a contact-based interface, which is another electronic module of the card 100 embedded in the flat sheets.

In one implementation, the smart card IC module 110 includes a first microelectronic chip with a chip module antenna and a second microelectronic chip that is electrically connected to the contact pads.

The coil antenna unit 132 comprises a module coupling antenna portion 143, a card reader coupling antenna portion 147, and a chip capacitor module 150. The card reader coupling antenna portion 147 is electrically or integrally connected to the module coupling antenna portion 143. The module coupling antenna portion 143 is positioned in the vicinity of the smart card IC module 110 for inductively coupling to the chip module antenna of the smart card IC module 110. The card reader coupling antenna portion 147 is made of electrical wire arranged in one or more loops forming a shape of an essentially rectangle. The rectangle has an area that covers substantially a whole major surface of the card body. The card reader coupling antenna portion 147 has two end terminals that are connected to the chip capacitor module 150.

The chip capacitor module 150 is similar to the chip capacitor module 50 mentioned above. In short, the chip capacitor module 150 acts as a resonant capacitor having a capacitance that enables the coil antenna unit 132 to resonate at a predetermined frequency of about 13.56 megahertz so that the card reader coupling antenna portion 147 can inductively be coupled to a reader antenna of an external card reader. In one implementation, the chip capacitor module 150 has a capacitance of about 100 pf with a tolerance of +−5 pf.

Figure 15:
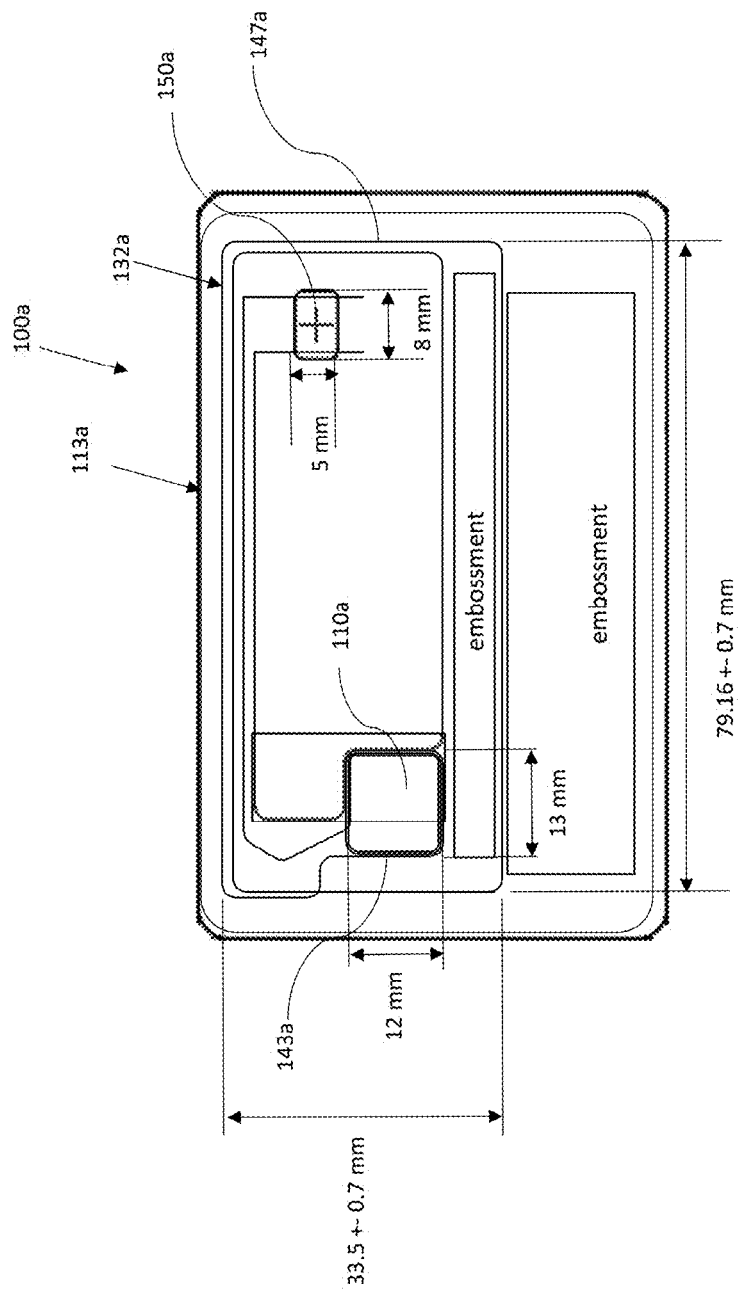
FIG. 15 illustrates a top view of another non-metal dual-interface smart card with a two-third size antenna unit.

FIG. 15 shows another card 100a, which is a variant of the card 100 with a two-third size antenna. The card 100a has parts that are similar to the parts of the card 100 having similar functions and been arranged in a similar structure. Different from the card reader coupling antenna portion 147 of the card 100, a card reader coupling antenna portion 147a of the card 100a is provided with a shape of an essentially rectangle. The rectangle is positioned next to a long outer edge and to two short outer edges of the card such that it covers about two-thirds of a major surface of the card body.

Figure 16:
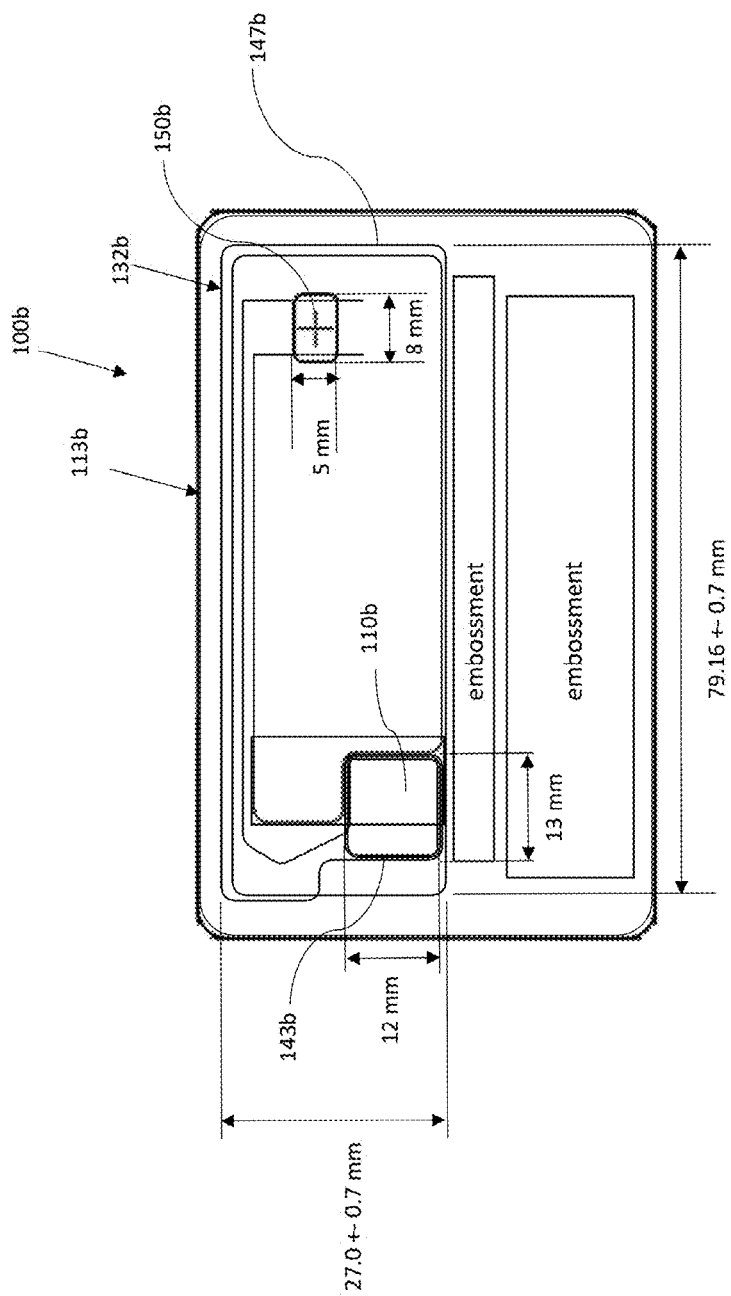
FIG. 16 illustrates a top view of a further non-metal dual-interface smart card with a half-size antenna unit.

FIG. 16 shows another card 100b that is a variant of the card 100 with a half-size antenna. The card 100a has parts that are similar to the parts of the card 100 having similar functions and been arranged in a similar structure. Different from the card reader coupling antenna portion 147 of the card 100, a card reader coupling antenna portion 147b of the card 100b is provided with a shape of an essentially rectangle. The rectangle is positioned next to a long outer edge and to two short outer edges of the card such that it covers about half of a major surface of the card body.

For both the cards 100a and 100b, an area of the card body that is outside the rectangular antenna can be used for embossing, thereby allowing more design features to be incorporated into the card to appeal to card users.

These non-metal smart cards 100, 100a, and 100b provide several benefits.

The chip capacitor module has an accurate and consistent capacitance that enables the coil antenna unit of the inlay to have a consistent efficiency without the need of tuning the coil antenna unit after assembly of the inlays. This can reduce the total production cost of the inlays.

Figure 17:
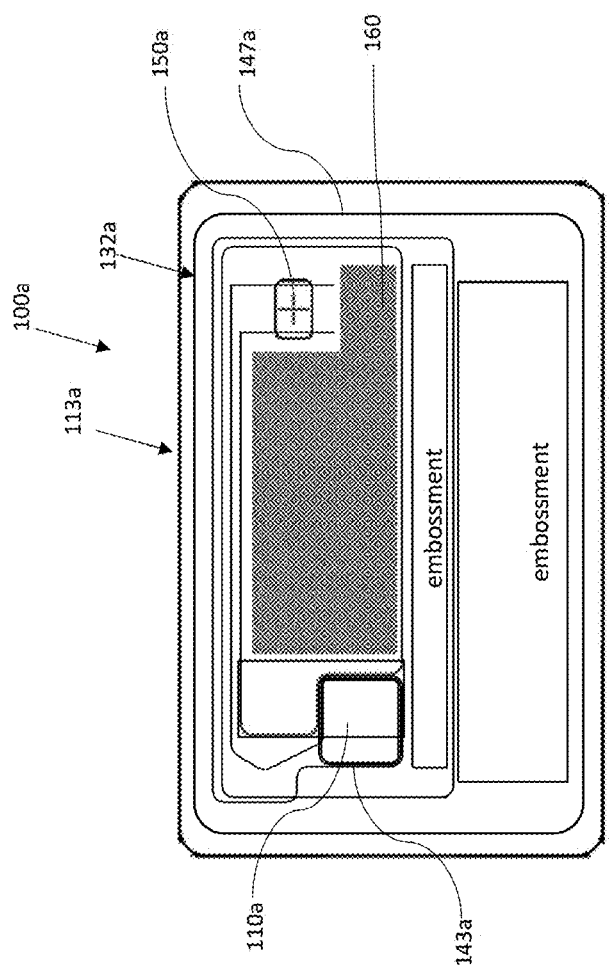
FIG. 17 illustrates the non-metal smart card of FIG. 15 having a large unoccupied space.
Figure 18:
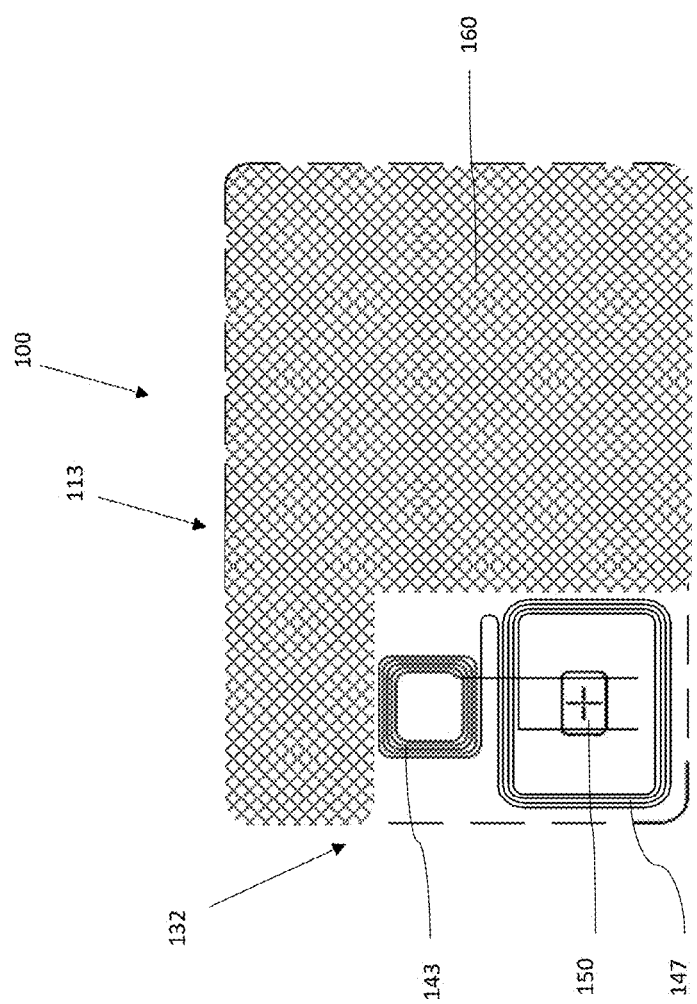
FIG. 18 illustrates a first non-metal smart card having an antenna unit that is placed in a first position.
Figure 19:
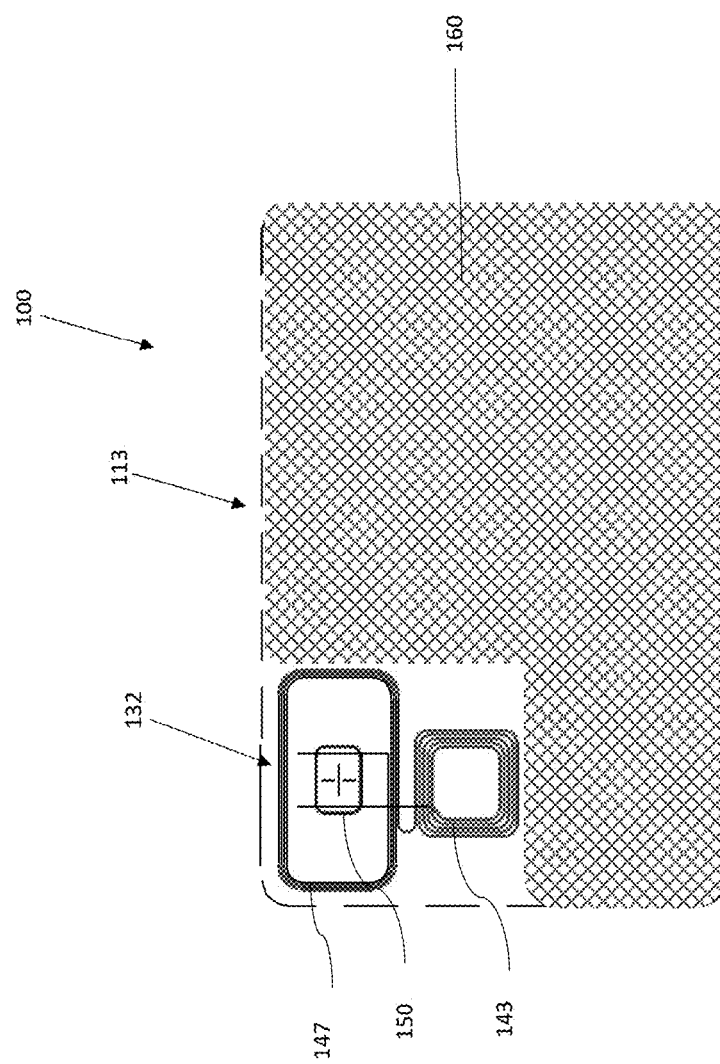
FIG. 19 illustrates a second non-metal smart card having an antenna unit that is placed in a second position.
Figure 20:
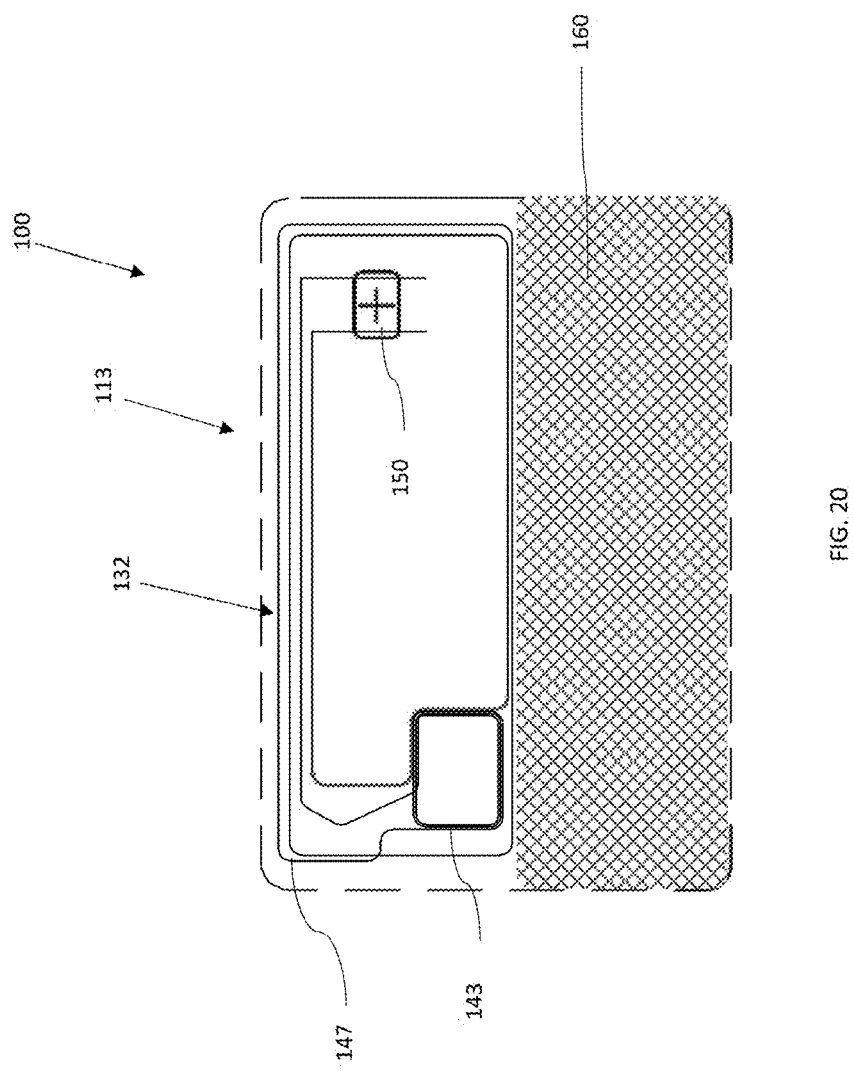
FIG. 20 illustrates a third non-metal smart card having an antenna unit that is placed in a third position.
Figure 21:
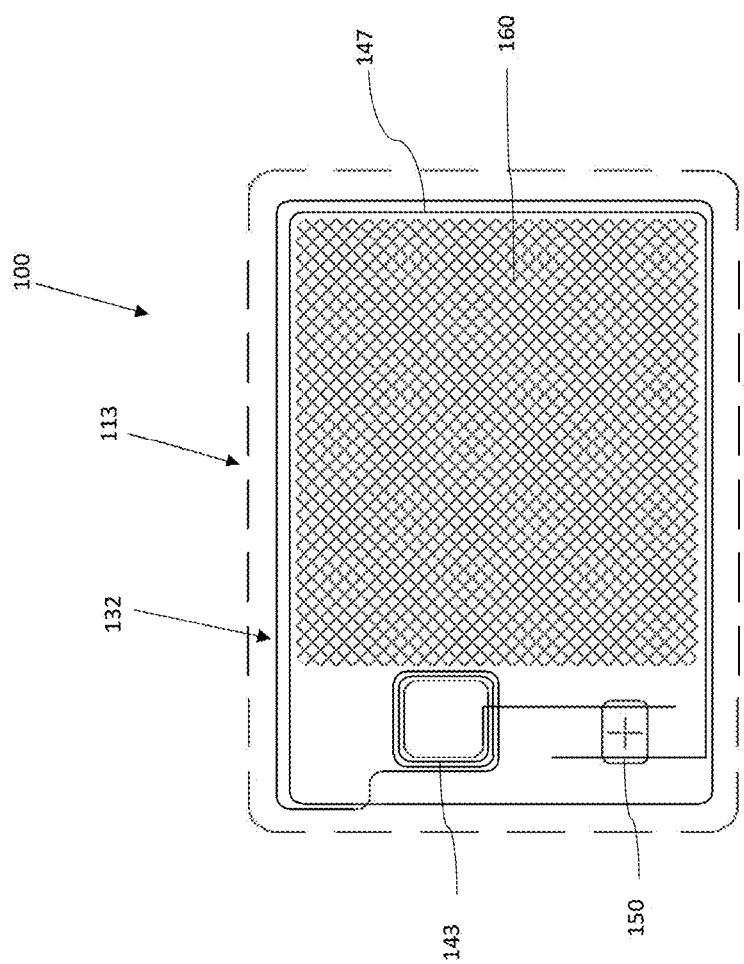
FIG. 21 illustrates a fourth non-metal smart card having an antenna unit that is placed in a fourth position.

Furthermore, the chip capacitor module is small, and it has a high capacitance that makes the coil antenna unit relatively small. The coil antenna unit, therefore, occupies a small space in the inlay. This allows the inlay of the card to have a large unoccupied space. The unoccupied space can be used to incorporate additional functionality or design features that the other plastic cards may not have due to limited space. An example of the smart card having a large unoccupied space 160 is shown in FIG. 17. The space 160 can be used for the placement of one or more electronic modules, which can be electrically connected to the card reader coupling antenna 147b. The electronic modules can also be connected to a battery of a smart card.

The electronic modules can include a light source comprising a plurality of light-emitting diodes (LED) for illuminating an image such as a logo of a card, a biometric fingerprint sensor for reading a fingerprint pattern of a card user, a dynamic card verification value (dCVV) device for generating a unique number for authentication of a card used for every payment transaction, wherein the generated numbers for different transactions are different, an organic light-emitting diode (OLED) display for showing information of a smart card and a pin pad for receiving a personal identification number (PIN) from a card user. Each electronic module can be placed at a predetermined position according to a user requirement. These added functional and design features can make the cards more appealing to a population of diverse card users.

The coil antenna unit 132 can have different sizes and shapes according to user requirements. It is small and it can occupy a small space of the inlay 113 as shown in FIGS. 18, 19, 20, and 21, wherein the inlay 113 has a large unoccupied space 160. The space 160 can be used for the placement of the above-mentioned electronic modules. The space 160 can also be partly or fully covered with transparent plastic material during the making of a smart card. The transparent portion of the smart card can blend with other design features of the smart card to improve the aesthetic appearance of the smart card.

Figure 22:
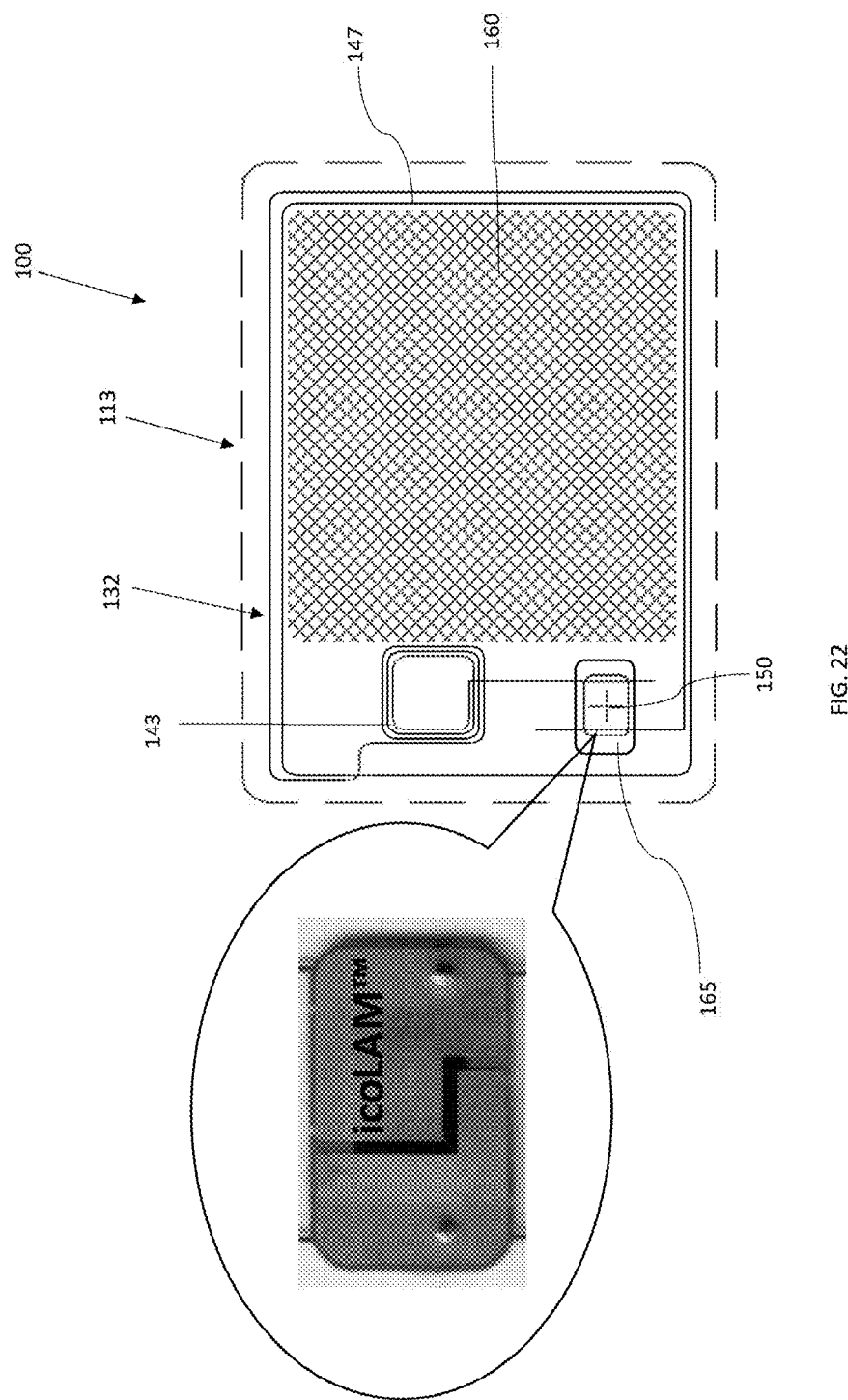
FIG. 22 illustrates a chip capacitor module of the antenna unit of FIG. 21, wherein the chip capacitor module comprises a metal substrate that is etched with a visible feature, FIG. 23 illustrate a non-metal contactless smart card comprising an inlay that includes a smart card IC module and an antenna unit that is electrically connected to the smart card IC module.

A transparent portion of the smart card can be provided such that a card user can view a unique feature that is embedded within the smart card. The unique feature can be text and/or a pattern, such as a logo. The unique feature is often etched on a major surface of the metal substrate of the chip capacitor module. An example of the unique feature is shown in FIG. 22, which shows a smart card 100 having a chip capacitor module 150 comprising a metal substrate. The metal substrate is etched with a feature comprising text and/or a pattern. The pattern can comprise bending lines. The feature can be viewed through a transparent portion 165 of the smart card 100, which is provided adjacent to the chip capacitor module 150. The unique visible feature is difficult to be duplicated as it is embedded within the smart card. This unique visible feature can act as a security feature that can easily be recognized to distinguish an authentic smart card having this unique security feature from other smart cards without the same security feature.

Figure 23:
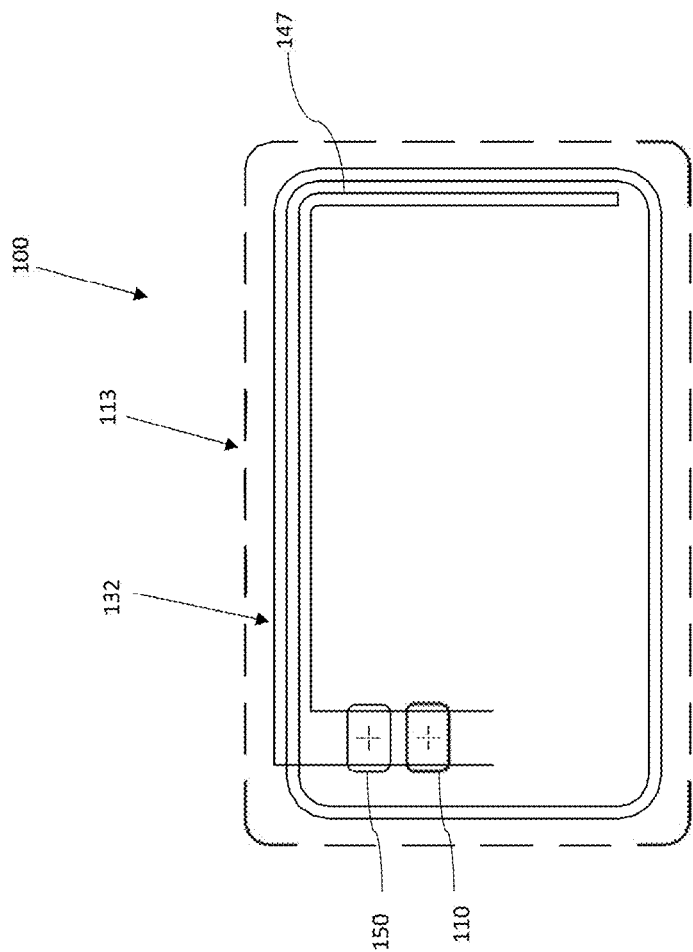

FIG. 23 shows another plastic contactless smart card 100 using direct connection technology. The card 100 includes an inlay 113. The inlay 113 includes an antenna unit 132 comprising a card reader coupling antenna 147, a chip capacitor module 150, and a smart card IC module 110. The card reader coupling antenna 147 is electrically connected to the chip capacitor module 150 and the smart card IC module 110. The chip capacitor module 150 is also electrically connected to the smart card IC module 110 in a parallel manner. The chip capacitor module 150 comprises a discrete ceramic capacitor.

The chip capacitor module 150 acts to increase the effective capacitance of the antenna unit 132 for applications that require the antenna unit 132 to have higher capacitance. Such applications include matching with a card reader infrastructure when an ISO-sized smart card does not provide a satisfactory RF performance due to the intrinsic capacitance of the standard smart card IC module being small. The standard intrinsic capacitance is often about 17 pf. To meet the RF performance, the ISO-sized smart card is often made with a special smart card IC module having a higher intrinsic capacitance of, for example, about 70 pf. However, this special smart card IC module is much more expensive than the combined cost of the standard smart card IC module and the chip capacitor module. Incorporating the chip capacitor module in the ISO-sized smart card can avoid using the special smart card IC module, thereby lowering the production cost of the ISO-sized smart card. Furthermore, the standard smart card IC module is often readily available, and this can lead to better lead time and lower inventory management cost of the standard smart card IC modules.

The application also provides a wireless tag comprising a tag inlay.

Figure 24:
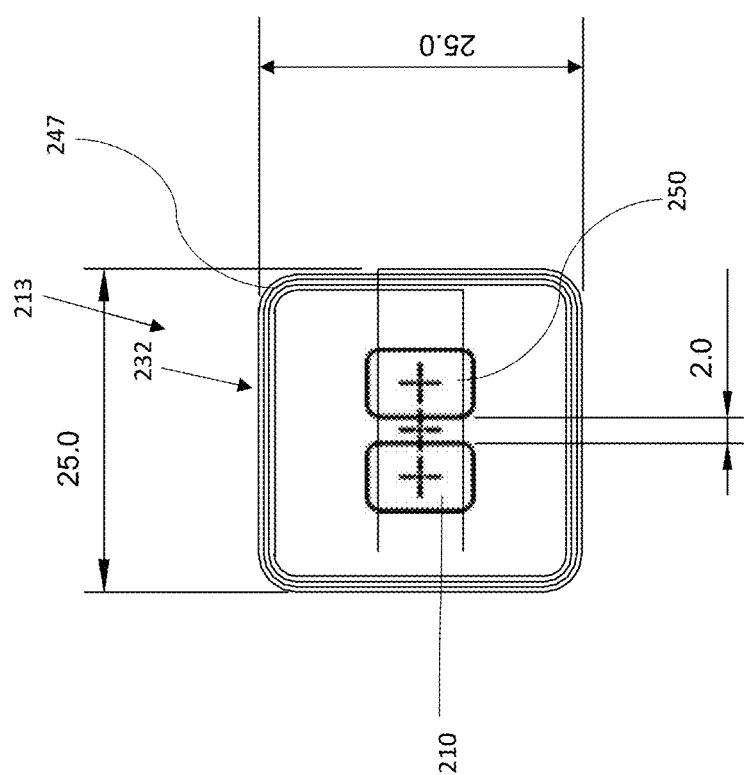
FIG. 24 illustrates a first wireless tag inlay for an electronic device.

FIG. 24 shows a first tag inlay 213 for a wireless tag. The wireless tag can be embedded or attached to a portable electronic device such as a key fob or a wearable electronic device. The key fob refers to a small security device with built-in authentication for controlling and securing access to, for example, mobile devices, computer systems, network services, and data. The wearable device refers to, for example, an electronic device that can be worn as an accessory or embedded in clothing.

The first tag inlay 213 comprises an antenna unit 232. The antenna unit 232 comprises a tag reader coupling antenna 247, a chip capacitor module 250, and a tag integrated circuit (IC) module 210. The tag reader coupling antenna 247 is electrically connected to the chip capacitor module 250 and the tag IC module 210. The chip capacitor module 250 is also electrically connected to the tag smart card IC module 210 in a parallel manner. The chip capacitor module 250 is also similar to the chip capacitor module 150 of the non-metal dual interface smart card 100 mentioned above. The tag IC module 210 includes a microelectronic chip. The tag reader coupling antenna 247 has a plurality of windings that form a shape of a substantially square.

Figure 25:
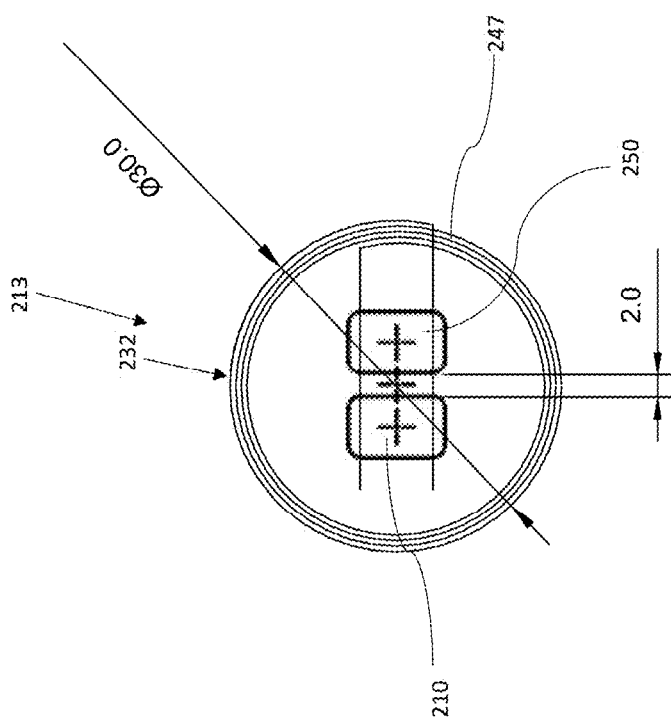
FIG. 25 illustrates a second wireless tag inlay for a wireless device, which is a variant of the first wireless tag inlay of FIG. 24.

FIG. 25 shows a second tag inlay 213 for a wireless tag. The second tag inlay 213 includes parts that are similar to the corresponding parts of the first tag inlay 213 in terms of arrangements and functional relationships. A tag reader coupling antenna 247 of the second inlay 213 has a plurality of windings that form a shape of a substantially circle.

Figure 26:
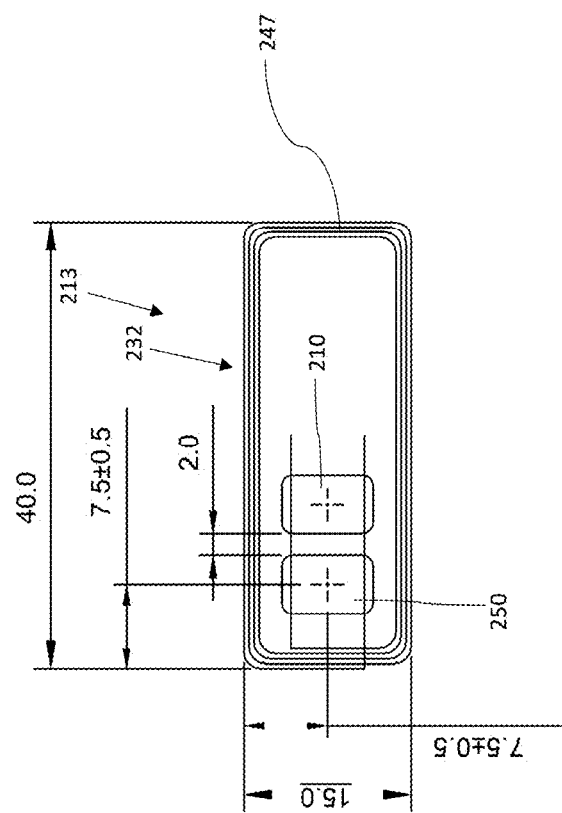
FIG. 26 illustrates a third wireless tag inlay for a wireless device, which is a variant of the first wireless tag inlay of FIG. 24.

FIG. 26 shows a third tag inlay 213 for a wireless tag. The third tag inlay 213 includes parts that are similar to the corresponding parts of the first tag inlay 213 in terms of arrangements and functional relationships. A tag reader coupling antenna 247 of the third inlay 213 has a plurality of windings that form a shape of a substantially rectangle.

The application also provides an electronic data page of a passport. The electronic data page of the passport includes a plurality of plastic sheets and a tag inlay 213 mentioned above. The plastic sheets are arranged in a stack such that the inlay 213 is positioned between the plastic sheets. The stack of the plastic sheets and the inlay 213 includes a transparent portion, which is positioned next to the chip capacitor module 250 of the inlay 213.

The chip capacitor module 250 comprises a metal substrate and a discrete capacitor that is attached to a major inner surface of the metal substrate. The metal substrate has a major outer surface that is opposite the inner surface of the metal substrate. The outer surface is etched with a unique visible feature comprising text and/or a pattern.

The transparent portion acts to allow a person to view the unique feature, which acts as a security feature for determining the authenticity of the passport.

The size and the shape of the tag reader coupling antenna 247 of the tag inlay 213 can be varied according to user requirements.

Although the above description contains much specificity, this should not be construed as limiting the scope of the embodiments but merely providing illustration of the foreseeable embodiments.

The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

REFERENCE NUMBERS 1 smart card
1b smart card
1c smart card
1d smart card
4 card body
4b card body
4c card body
4d card body
7 opening
7b opening
7c opening
7d opening
10 smart card IC module
10b smart card IC module
10c smart card IC module
13 inlay
13b inlay
13c inlay
13d inlay 17 slot
17b slot
17c slot
20 coupling aperture portion
20b coupling aperture portion
20c coupling aperture portion
20d coupling aperture portion
20d1 rectangular part of coupling aperture portion
20d2 triangular part of coupling aperture portion
23 antenna aperture portion
23b antenna aperture portion
23c antenna aperture portion
23d antenna aperture portion
27 microelectronic chip
27b microelectronic chip
27c microelectronic chip
29 chip module antenna
32 antenna unit
32b antenna unit
32c antenna unit
32d antenna unit
35 antenna carrying sheet
37 thickness compensation sheet
40 overlay sheet
43 module coupling antenna
43d module coupling antenna
47 card reader coupling antenna
47b card reader coupling antenna
47c card reader coupling antenna
47d card reader coupling antenna
50 chip capacitor module
50b chip capacitor module
50c chip capacitor module
50d chip capacitor module
53 inlay sheet
60 flow chart
62 step
64 step
66 step
68 step
70 step
72 step
74 step
78 contact-based interface
78c contact-based interface
100 smart card
100a smart card
100b smart card
110 smart card IC module
110a smart card IC module
110b smart card IC module
113 inlay
113a inlay
113b inlay
132 antenna unit
132a antenna unit
132b antenna unit
143 module coupling antenna
143a module coupling antenna
143b module coupling antenna
147 card reader coupling antenna
147a card reader coupling antenna
147b card reader coupling antenna
150 chip capacitor module
150a chip capacitor module
150b chip capacitor module
160 space
165 transparent portion
210 tag integrated circuit module
213 inlay
232 antenna unit
247 tag reader coupling antenna
250 chip capacitor module

The invention claimed is:

1. A chip card comprising:
a chip module comprising a chip module antenna,
a contact interface being electrically connected to the chip module for electrically connecting the chip module to an external card reader when the chip card is positioned in the external card reader,
a metal layer comprising an opening that extends to an outer edge of the metal layer, and
an inlay arranged in the opening, the inlay comprising
a module coupling antenna which inductively couples with the chip module antenna,
a card reader coupling antenna which inductively couples with a reader antenna of the external card reader, the card reader coupling antenna being electrically connected to the module coupling antenna, and
a chip capacitor module that is electrically connected to the card reader coupling antenna for enabling the card reader coupling antenna to resonate at a predetermined frequency,
wherein the chip capacitor module comprises at least one passive component for storing electrical energy,
wherein the at least one passive component has a capacitance within a range from 40 picofarads to 140 picofarads and a major area that is smaller than 2.6 square millimeters, and
wherein the card reader coupling antenna has a circular shape with a diameter of 25 millimeters or less.

2. The chip card according to claim 1, wherein the at least one passive component has a capacitance within a range from 80 picofarads to 120 picofarads.

3. The chip card according to claim 1, wherein the module coupling antenna is rectangular in shape and has a long edge of 15 millimeters or less.

4. The chip card according to claim 1, wherein the at least one passive component has a thickness that is smaller than 0.6 millimeters.

5. The chip card according claim 1, wherein the contact interface comprises a plurality of contact pads that are electrically connected to the chip module.

6. The chip card according to claim 1, wherein the chip capacitor module has a capacitance of about 100 picofarads (pf).

7. An inlay for a chip card, the inlay comprising:
a module coupling antenna for inductively coupling to a chip module antenna of a chip module of the chip card,
a card reader coupling antenna for inductively coupling to a reader antenna of an external card reader, the card reader coupling antenna being electrically connected to the module coupling antenna, and
a chip capacitor module that is electrically connected to the card reader coupling antenna for enabling the card reader coupling antenna to resonate at a predetermined frequency,
wherein the chip capacitor module comprises at least one passive component for storing electrical energy,
wherein the at least one passive component has a capacitance within a range from 40 picofarads to 140 picofarads and a major area that is smaller than 2.6 square millimeters, and wherein the card reader coupling antenna has a circular shape with a diameter of 25 millimeters or less.

8. The inlay according to claim 7, wherein the at least one passive component has a capacitance within a range from 80 picofarads to 120 picofarads.

9. The inlay according to claim 7, wherein the chip capacitor module has a capacitance of about 100 picofarads (pf).

10. The inlay according to claim 7, the module coupling antenna is rectangular in shape and has a long edge of 15 millimeters or less.

11. The inlay according to claim 7, wherein the at least one passive component has a thickness that is smaller than 0.6 millimeters.

12. The inlay according to claim 7, wherein the card reader coupling antenna comprises a plurality of wire loops that are positioned next to outer edges of the inlay.

13. The inlay according to claim 7, wherein the chip capacitor module further comprises a metal substrate that is provided with a visible feature.

14. The inlay according to claim 13, wherein the visible feature comprises at least one member selected from a group consisting of text and a pattern.

15. A chip card comprising:
the inlay according to claim 7,
the chip module corresponding to the chip module antenna, and
a plurality of contact pads that are electrically connected to the chip module.

16. The chip card according to claim 15 further comprising a plurality of plastic sheets that are arranged in a stack such that the inlay is positioned between the plastic sheets, wherein the plastic sheets comprise a transparent portion for allowing a user to view a visible feature that is provided on the chip capacitor module of the inlay.

17. An inlay for an electronic device, the inlay comprising:
a reader coupling antenna for inductively coupling to a reader antenna of an external reader, the reader coupling antenna comprising terminals for electrically connecting to a chip module of the electronic device, and
a chip capacitor module that is electrically connected to the reader coupling antenna for enabling the reader coupling antenna to resonate at a predetermined frequency,
wherein the chip capacitor module comprises at least one passive component for storing electrical energy,
wherein the at least one passive component has a capacitance within a range from 40 picofarads to 140 picofarads and a major area that is smaller than 2.6 square millimeters, and
wherein the chip capacitor module further comprises a metal substrate that is provided with a visible feature.

18. The inlay according to claim 17 further comprising the chip module that is electrically connected to the reader coupling antenna.

19. A chip card comprising:
a metal layer comprising an opening that extends to an outer edge of the metal layer, and the inlay according to claim 18, which is arranged in the opening.

20. An electronic data page for a passport comprising:
a plurality of plastic sheets, and
the inlay according to claim 18, the inlay being positioned between the plastic sheets,
wherein the plastic sheets and the inlay comprise a transparent portion for allowing a user to view a visible feature of the inlay.

21. The inlay according to claim 17, wherein the card reader coupling antenna has a circular shape with a diameter of 25 millimeters or less.

22. The inlay according to claim 17, wherein the chip capacitor module has a capacitance of about 100 picofarads (pf).

23. The inlay according to claim 17, wherein the at least one passive component has a thickness that is smaller than 0.3 millimeters.

24. The inlay according to claim 17, wherein the at least one passive component has a thickness that is smaller than 0.6 millimeters.

25. The inlay according to claim 17, wherein the visible feature comprises at least one member selected from a group consisting of text and a pattern.

26. A chip card comprising:
a chip module,
a contact interface being electrically connected to the chip module for electrically connecting the chip module to an external card reader when the chip card is positioned in the external card reader,
a metal layer comprising an opening that extends to an outer edge of the metal layer, and
an inlay according to claim 17 being arranged in the opening, wherein the reader coupling antenna of the inlay is electrically connected to the chip module.

27. A method for producing an inlay comprising:
providing an antenna carrying sheet,
providing the antenna carrying sheet with an opening for receiving a chip capacitor module,
inserting the chip capacitor module into the opening,
laying an electrical wire onto the antenna carrying sheet to form a module coupling antenna and a card reader coupling antenna such that the card reader coupling antenna surrounds the chip capacitor module, and
connecting electrically the chip capacitor module to the card reader coupling antenna,
wherein the chip capacitor module comprises at least one passive component for storing electrical energy,
wherein the at least one passive component has a capacitance within a range from 40 picofarads to 140 picofarads and a major area that is smaller than 2.6 square millimeters, and
wherein the card reader coupling antenna has a circular shape with a diameter of 25 millimeters or less.

\* \* \* \* \*